US012385379B2

(12) United States Patent
Yeung et al.

(10) Patent No.: US 12,385,379 B2
(45) Date of Patent: *Aug. 12, 2025

(54) METHODS FOR DETECTION AND MITIGATION OF WELL SCREEN OUT

(71) Applicant: BJ Energy Solutions, LLC, The Woodlands, TX (US)

(72) Inventors: Tony Yeung, The Woodlands, TX (US); Ricardo Rodriguez-Ramon, The Woodlands, TX (US); Joseph Foster, The Woodlands, TX (US)

(73) Assignee: BJ Energy Solutions, LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/583,167

(22) Filed: Feb. 21, 2024

(65) Prior Publication Data

US 2025/0003321 A1 Jan. 2, 2025

Related U.S. Application Data

(63) Continuation of application No. 17/991,007, filed on Nov. 21, 2022, now Pat. No. 11,939,854, which is a
(Continued)

(51) Int. Cl.
*E21B 43/267* (2006.01)
*E21B 21/08* (2006.01)
(Continued)

(52) U.S. Cl.
CPC ............ *E21B 43/267* (2013.01); *E21B 21/08* (2013.01); *E21B 43/12* (2013.01); *E21B 43/26* (2013.01);
(Continued)

(58) Field of Classification Search
CPC ........ E21B 43/267; E21B 21/08; E21B 43/12; E21B 43/26; E21B 43/2607; G08B 21/182
See application file for complete search history.

(56) References Cited

U.S. PATENT DOCUMENTS 1,716,049 A 6/1929 Greve
1,726,633 A 9/1929 Smith
(Continued)

FOREIGN PATENT DOCUMENTS

AU 9609498 A 7/1999
AU 737970 B2 9/2001
(Continued)

OTHER PUBLICATIONS

Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
(Continued)

*Primary Examiner* — James G Sayre
(74) *Attorney, Agent, or Firm* — Norton Rose Fulbright US LLP

(57) ABSTRACT

Methods, systems, and controllers for detecting and mitigating well screen outs may include a controller configured to operate a fracturing pump to supply fluid at a discharge rate to a wellhead at a fracturing well site. The controller may also operate a blender positioned to deliver a blend of proppant and fluid to the fracturing pump. The controller may compare a fluid pressure increase rate to a preselected increase rate indicative of a potential well screen out. The controller may incrementally decrease the discharge rate of the fracturing pump and a flow rate of a blender when the fluid pressure increase rate of the wellhead exceeds the preselected increase rate and the fluid pressure is within a
(Continued)

preselected percentage of a maximum wellhead pressure until the fluid pressure of the fluid supplied to the wellhead is stabilized.

19 Claims, 3 Drawing Sheets

Related U.S. Application Data continuation of application No. 17/355,920, filed on Jun. 23, 2021, now Pat. No. 11,566,506, which is a continuation of application No. 17/303,841, filed on Jun. 9, 2021, now Pat. No. 11,208,881, which is a continuation of application No. 17/182,408, filed on Feb. 23, 2021, now Pat. No. 11,066,915.

(60) Provisional application No. 62/705,050, filed on Jun. 9, 2020.

(51) Int. Cl.
*E21B 43/12* (2006.01)
*E21B 43/26* (2006.01)
*G08B 21/18* (2006.01)

(52) U.S. Cl.
CPC ........ *E21B 43/2607* (2020.05); *G08B 21/182* (2013.01)

(56) References Cited

U.S. PATENT DOCUMENTS

| | | | |
|---|---|---|---|
| 2,178,662 | A | 11/1939 | Hanson |
| 2,427,638 | A | 9/1947 | Vilter et al. |
| 2,498,229 | A | 2/1950 | Adler |
| 2,535,703 | A | 12/1950 | Smith et al. |
| 2,572,711 | A | 10/1951 | Fischer |
| 2,820,341 | A | 1/1958 | Amann |
| 2,868,004 | A | 1/1959 | Runde |
| 2,940,377 | A | 6/1960 | Darnell et al. |
| 2,947,141 | A | 8/1960 | Russ |
| 2,956,738 | A | 10/1960 | Af et al. |
| 3,068,796 | A | 12/1962 | Pfluger et al. |
| 3,191,517 | A | 6/1965 | Solzman |
| 3,257,031 | A | 6/1966 | Dietz |
| 3,274,768 | A | 9/1966 | Klein |
| 3,332,491 | A | 7/1967 | Flickinger |
| 3,378,074 | A | 4/1968 | Kiel |
| 3,382,671 | A | 5/1968 | Ehni, III |
| 3,401,873 | A | 9/1968 | Privon et al. |
| 3,463,612 | A | 8/1969 | Whitsel, Jr. |
| 3,496,880 | A | 2/1970 | Wolff |
| 3,550,696 | A | 12/1970 | Kenneday |
| 3,560,053 | A | 2/1971 | Ortloff |
| 3,586,459 | A | 6/1971 | Zerlauth |
| 3,632,222 | A | 1/1972 | Cronstedt |
| 3,656,582 | A | 4/1972 | Alcock |
| 3,667,868 | A | 6/1972 | Brunner |
| 3,692,434 | A | 9/1972 | Schnear |
| 3,739,872 | A | 6/1973 | McNair |
| 3,757,581 | A | 9/1973 | Mankin et al. |
| 3,759,063 | A | 9/1973 | Bendall |
| 3,765,173 | A | 10/1973 | Harris |
| 3,771,916 | A | 11/1973 | Flanigan et al. |
| 3,773,438 | A | 11/1973 | Hall et al. |
| 3,781,135 | A | 12/1973 | Nickell |
| 3,786,835 | A | 1/1974 | Finger |
| 3,791,682 | A | 2/1974 | Mitchell |
| 3,796,045 | A | 3/1974 | Foster-Pegg |
| 3,814,549 | A | 6/1974 | Cronstedt |
| 3,820,922 | A | 6/1974 | Sensinger et al. |
| 3,847,511 | A | 11/1974 | Cole |
| 3,866,108 | A | 2/1975 | Yannone et al. |
| 3,875,380 | A | 4/1975 | Rankin |
| 3,963,372 | A | 6/1976 | McLain et al. |
| 4,010,613 | A | 3/1977 | McInerney |
| 4,019,477 | A | 4/1977 | Overton |
| 4,031,407 | A | 6/1977 | Reed |
| 4,047,569 | A | 9/1977 | Tagirov et al. |
| 4,050,862 | A | 9/1977 | Buse |
| 4,059,045 | A | 11/1977 | McClain |
| 4,086,976 | A | 5/1978 | Holm et al. |
| 4,117,342 | A | 9/1978 | Melley, Jr. |
| 4,173,121 | A | 11/1979 | Yu |
| 4,204,808 | A | 5/1980 | Reese et al. |
| 4,209,079 | A | 6/1980 | Marchal et al. |
| 4,209,979 | A | 7/1980 | Woodhouse et al. |
| 4,222,229 | A | 9/1980 | Uram |
| 4,239,396 | A | 12/1980 | Arribau et al. |
| 4,269,569 | A | 5/1981 | Hoover |
| 4,311,395 | A | 1/1982 | Douthitt et al. |
| 4,330,237 | A | 5/1982 | Battah |
| 4,341,508 | A | 7/1982 | Rambin, Jr. |
| 4,357,027 | A | 11/1982 | Zeitlow |
| 4,383,478 | A | 5/1983 | Jones |
| 4,402,504 | A | 9/1983 | Christian |
| 4,430,047 | A | 2/1984 | Ilg |
| 4,442,665 | A | 4/1984 | Fick et al. |
| 4,457,325 | A | 7/1984 | Green |
| 4,470,771 | A | 9/1984 | Hall et al. |
| 4,483,684 | A | 11/1984 | Black |
| 4,505,650 | A | 3/1985 | Hannett et al. |
| 4,574,880 | A | 3/1986 | Handke |
| 4,584,654 | A | 4/1986 | Crane |
| 4,620,330 | A | 11/1986 | Izzi, Sr. |
| 4,672,813 | A | 6/1987 | David |
| 4,754,607 | A | 7/1988 | Mackay |
| 4,782,244 | A | 11/1988 | Wakimoto |
| 4,796,777 | A | 1/1989 | Keller |
| 4,869,209 | A | 9/1989 | Young |
| 4,913,625 | A | 4/1990 | Gerlowski |
| 4,983,259 | A | 1/1991 | Duncan et al. |
| 4,990,058 | A | 2/1991 | Eslinger |
| 5,032,065 | A | 7/1991 | Yamamuro et al. |
| 5,135,361 | A | 8/1992 | Dion |
| 5,167,493 | A | 12/1992 | Kobari |
| 5,245,970 | A | 9/1993 | Iwaszkiewicz et al. |
| 5,275,041 | A | 1/1994 | Poulsen |
| 5,291,842 | A | 3/1994 | Sallstrom et al. |
| 5,326,231 | A | 7/1994 | Pandeya et al. |
| 5,362,219 | A | 11/1994 | Paul et al. |
| 5,482,116 | A | 1/1996 | El-Rabaa et al. |
| 5,511,956 | A | 4/1996 | Hasegawa et al. |
| 5,517,854 | A | 5/1996 | Plumb et al. |
| 5,537,813 | A | 7/1996 | Davis et al. |
| 5,553,514 | A | 9/1996 | Walkowc |
| 5,560,195 | A | 10/1996 | Anderson et al. |
| 5,586,444 | A | 12/1996 | Fung |
| 5,622,245 | A | 4/1997 | Reik et al. |
| 5,626,103 | A | 5/1997 | Haws et al. |
| 5,634,777 | A | 6/1997 | Albertin et al. |
| 5,651,400 | A | 7/1997 | Corts et al. |
| 5,678,460 | A | 10/1997 | Walkowc |
| 5,717,172 | A | 2/1998 | Griffin, Jr. et al. |
| 5,720,598 | A | 2/1998 | de Chizzelle |
| 5,761,084 | A | 6/1998 | Edwards |
| 5,811,676 | A | 9/1998 | Spalding et al. |
| 5,839,888 | A | 11/1998 | Harrison |
| 5,846,062 | A | 12/1998 | Yanagisawa et al. |
| 5,875,744 | A | 3/1999 | Vallejos |
| 5,983,962 | A | 11/1999 | Gerardot |
| 5,992,944 | A | 11/1999 | Hara |
| 6,041,856 | A | 3/2000 | Thrasher et al. |
| 6,050,080 | A | 4/2000 | Horner |
| 6,067,962 | A | 5/2000 | Bartley et al. |
| 6,071,188 | A | 6/2000 | O'Neill et al. |
| 6,074,170 | A | 6/2000 | Bert et al. |
| 6,123,751 | A | 9/2000 | Nelson et al. |
| 6,129,335 | A | 10/2000 | Yokogi |
| 6,145,318 | A | 11/2000 | Kaplan et al. |
| 6,186,334 | B1 | 2/2001 | Dohmann et al. |
| 6,230,481 | B1 | 5/2001 | Jahr |
| 6,279,309 | B1 | 8/2001 | Lawlor et al. |

(56) References Cited

U.S. PATENT DOCUMENTS 6,321,860 B1 11/2001 Reddoch
6,334,746 B1 1/2002 Nguyen et al.
6,367,548 B1 4/2002 Purvis et al.
6,401,472 B2 6/2002 Pollrich et al.
6,530,224 B1 3/2003 Conchieri
6,543,395 B2 4/2003 Green
6,644,844 B2 11/2003 Neal et al.
6,655,922 B1 12/2003 Flek
6,669,453 B1 12/2003 Breeden et al.
6,765,304 B2 7/2004 Baten et al.
6,786,051 B2 9/2004 Kristich et al.
6,832,900 B2 12/2004 Leu
6,851,514 B2 2/2005 Han et al.
6,859,740 B2 2/2005 Stephenson et al.
6,901,735 B2 6/2005 Lohn
6,935,424 B2 8/2005 Lehman et al.
6,962,057 B2 11/2005 Kurokawa et al.
7,007,966 B2 3/2006 Campion
7,047,747 B2 5/2006 Tanaka
7,065,953 B1 6/2006 Kopko
7,143,016 B1 11/2006 Discenzo et al.
7,222,015 B2 5/2007 Davis et al.
7,281,519 B2 10/2007 Schroeder et al.
7,388,303 B2 6/2008 Seiver
7,404,294 B2 7/2008 Sundin
7,442,239 B2 10/2008 Armstrong et al.
7,516,793 B2 4/2009 Dykstra
7,524,173 B2 4/2009 Cummins
7,545,130 B2 6/2009 Latham
7,552,903 B2 6/2009 Dunn et al.
7,563,076 B2 7/2009 Brunet et al.
7,563,413 B2 7/2009 Naets et al.
7,574,325 B2 8/2009 Dykstra
7,581,379 B2 9/2009 Yoshida et al.
7,594,424 B2 9/2009 Fazekas
7,614,239 B2 11/2009 Herzog et al.
7,627,416 B2 12/2009 Batenburg et al.
7,677,316 B2 3/2010 Butler et al.
7,721,521 B2 5/2010 Kunkle et al.
7,730,711 B2 6/2010 Kunkle et al.
7,779,961 B2 8/2010 Matte
7,789,452 B2 9/2010 Dempsey et al.
7,836,949 B2 11/2010 Dykstra
7,841,394 B2 11/2010 McNeel et al.
7,845,413 B2 12/2010 Shampine et al.
7,861,679 B2 1/2011 Lemke et al.
7,886,702 B2 2/2011 Jerrell et al.
7,900,724 B2 3/2011 Promersberger et al.
7,921,914 B2 4/2011 Bruins et al.
7,938,151 B2 5/2011 Hockner
7,955,056 B2 6/2011 Pettersson
7,980,357 B2 7/2011 Edwards
8,056,635 B2 11/2011 Shampine et al.
8,083,504 B2 12/2011 Williams et al.
8,099,942 B2 1/2012 Alexander et al.
8,186,334 B2 5/2012 Ooyama
8,196,555 B2 6/2012 Ikeda et al.
8,202,354 B2 6/2012 Iijima
8,316,936 B2 11/2012 Roddy et al.
8,336,631 B2 12/2012 Shampine et al.
8,388,317 B2 3/2013 Sung
8,414,673 B2 4/2013 Raje et al.
8,469,826 B2 6/2013 Brosowske
8,500,215 B2 8/2013 Gastauer et al.
8,506,267 B2 8/2013 Gambier et al.
8,575,873 B2 11/2013 Peterson et al.
8,616,005 B1 12/2013 Cousino, Sr.
8,621,873 B2 1/2014 Robertson et al.
8,641,399 B2 2/2014 Mucibabic et al.
8,656,990 B2 2/2014 Kajaria et al.
8,672,606 B2 3/2014 Glynn et al.
8,707,853 B1 4/2014 Dille et al.
8,708,667 B2 4/2014 Collingborn
8,714,253 B2 5/2014 Sherwood et al.
8,757,918 B2 6/2014 Ramnarain et al.
8,763,583 B2 7/2014 Hofbauer et al.
8,770,329 B2 7/2014 Spitler
8,784,081 B1 7/2014 Blume
8,789,601 B2 7/2014 Broussard et al.
8,794,307 B2 8/2014 Coquilleau et al.
8,801,394 B2 8/2014 Anderson
8,851,186 B2 10/2014 Shampine et al.
8,851,441 B2 10/2014 Acuna et al.
8,886,502 B2 11/2014 Walters et al.
8,894,356 B2 11/2014 Lafontaine et al.
8,905,056 B2 12/2014 Kendrick
8,951,019 B2 2/2015 Hains et al.
8,973,560 B2 3/2015 Krug
8,997,904 B2 4/2015 Cryer et al.
9,011,111 B2 4/2015 Lesko
9,016,383 B2 4/2015 Shampine et al.
9,032,620 B2 5/2015 Frassinelli et al.
9,057,247 B2 6/2015 Kumar et al.
9,097,249 B2 8/2015 Petersen
9,103,193 B2 8/2015 Coli et al.
9,121,257 B2 9/2015 Coli et al.
9,140,110 B2 9/2015 Coli et al.
9,175,810 B2 11/2015 Hains et al.
9,187,982 B2 11/2015 Dehring et al.
9,206,667 B2 12/2015 Khvoshchev et al.
9,212,643 B2 12/2015 Deliyski
9,217,318 B2 12/2015 Dusterhoft et al.
9,222,346 B1 12/2015 Walls
9,297,250 B2 3/2016 Dusterhoft et al.
9,324,049 B2 4/2016 Thomeer et al.
9,341,055 B2 5/2016 Weightman et al.
9,346,662 B2 5/2016 Van Vliet et al.
9,366,114 B2 6/2016 Coli et al.
9,376,786 B2 6/2016 Numasawa
9,394,829 B2 7/2016 Cabeen et al.
9,395,049 B2 7/2016 Vicknair et al.
9,401,670 B2 7/2016 Minato
9,410,406 B2 8/2016 Yuan
9,410,410 B2 8/2016 Broussard et al.
9,410,546 B2 8/2016 Jaeger et al.
9,429,078 B1 8/2016 Crowe et al.
9,435,333 B2 9/2016 McCoy et al.
9,488,169 B2 11/2016 Cochran et al.
9,493,997 B2 11/2016 Liu et al.
9,512,783 B2 12/2016 Veilleux, Jr. et al.
9,534,473 B2 1/2017 Morris et al.
9,546,652 B2 1/2017 Yin
9,550,501 B2 1/2017 Ledbetter et al.
9,556,721 B2 1/2017 Jang et al.
9,562,420 B2 2/2017 Morris et al.
9,570,945 B2 2/2017 Fischer
9,579,980 B2 2/2017 Cryer et al.
9,587,649 B2 3/2017 Oehring
9,593,710 B2 3/2017 Laimboeck et al.
9,611,728 B2 4/2017 Oehring
9,617,808 B2 4/2017 Liu et al.
9,638,101 B1 5/2017 Crowe et al.
9,638,194 B2 5/2017 Wiegman et al.
9,650,871 B2 5/2017 Oehring et al.
9,656,762 B2 5/2017 Kamath et al.
9,689,316 B1 6/2017 Crom
9,695,808 B2 7/2017 Giessbach et al.
9,739,130 B2 8/2017 Young
9,764,266 B1 9/2017 Carter
9,777,748 B2 10/2017 Lu et al.
9,803,467 B2 10/2017 Tang et al.
9,803,793 B2 10/2017 Davi et al.
9,809,308 B2 11/2017 Aguilar et al.
9,829,002 B2 11/2017 Crom
9,840,897 B2 12/2017 Larson
9,840,901 B2 12/2017 Oehring et al.
9,845,730 B2 12/2017 Betti et al.
9,850,422 B2 12/2017 Lestz et al.
9,856,131 B1 1/2018 Moffitt, Jr.
9,863,279 B2 1/2018 Laing et al.
9,869,305 B1 1/2018 Crowe et al.
9,871,406 B1 1/2018 Churnock et al.
9,879,609 B1 1/2018 Crowe et al.
RE46,725 E 2/2018 Case et al.

(56) References Cited

U.S. PATENT DOCUMENTS

| | | | |
|---|---|---|---|
| 9,893,500 | B2 | 2/2018 | Oehring et al. |
| 9,893,660 | B2 | 2/2018 | Peterson et al. |
| 9,897,003 | B2 | 2/2018 | Motakef et al. |
| 9,920,615 | B2 | 3/2018 | Zhang et al. |
| 9,945,365 | B2 | 4/2018 | Hernandez et al. |
| 9,964,052 | B2 | 5/2018 | Millican et al. |
| 9,970,278 | B2 | 5/2018 | Broussard et al. |
| 9,981,840 | B2 | 5/2018 | Shock |
| 9,995,102 | B2 | 6/2018 | Dille et al. |
| 9,995,218 | B2 | 6/2018 | Oehring et al. |
| 10,008,880 | B2 | 6/2018 | Vicknair et al. |
| 10,008,912 | B2 | 6/2018 | Davey et al. |
| 10,018,096 | B2 | 7/2018 | Wallimann et al. |
| 10,020,711 | B2 | 7/2018 | Oehring et al. |
| 10,024,123 | B2 | 7/2018 | Steffenhagen et al. |
| 10,029,289 | B2 | 7/2018 | Wendorski et al. |
| 10,030,579 | B2 | 7/2018 | Austin et al. |
| 10,036,238 | B2 | 7/2018 | Oehring |
| 10,040,541 | B2 | 8/2018 | Wilson et al. |
| 10,060,293 | B2 | 8/2018 | Del Bono |
| 10,060,349 | B2 | 8/2018 | Morales Álvarez et al. |
| 10,077,933 | B2 | 9/2018 | Nelson et al. |
| 10,082,137 | B2 | 9/2018 | Graham et al. |
| 10,094,366 | B2 | 10/2018 | Marica |
| 10,100,827 | B2 | 10/2018 | Devan et al. |
| 10,107,084 | B2 | 10/2018 | Coli et al. |
| 10,107,085 | B2 | 10/2018 | Coli et al. |
| 10,114,061 | B2 | 10/2018 | Frampton et al. |
| 10,119,381 | B2 | 11/2018 | Oehring et al. |
| 10,125,750 | B2 | 11/2018 | Pfaff et al. |
| 10,134,257 | B2 | 11/2018 | Zhang et al. |
| 10,138,098 | B2 | 11/2018 | Sørensen et al. |
| 10,151,244 | B2 | 12/2018 | Giancotti et al. |
| 10,161,423 | B2 | 12/2018 | Rampen et al. |
| 10,174,599 | B2 | 1/2019 | Shampine et al. |
| 10,184,397 | B2 | 1/2019 | Austin et al. |
| 10,196,258 | B2 | 2/2019 | Kalala et al. |
| 10,221,856 | B2 | 3/2019 | Hernandez et al. |
| 10,227,854 | B2 | 3/2019 | Glass |
| 10,227,855 | B2 | 3/2019 | Coli et al. |
| 10,246,984 | B2 | 4/2019 | Payne et al. |
| 10,247,182 | B2 | 4/2019 | Zhang et al. |
| 10,253,598 | B2 | 4/2019 | Crews et al. |
| 10,254,732 | B2 | 4/2019 | Oehring et al. |
| 10,267,439 | B2 | 4/2019 | Pryce et al. |
| 10,280,724 | B2 | 5/2019 | Hinderliter |
| 10,287,943 | B1 | 5/2019 | Schiltz |
| 10,288,519 | B2 | 5/2019 | De La Cruz |
| 10,303,190 | B2 | 5/2019 | Shock |
| 10,305,350 | B2 | 5/2019 | Johnson et al. |
| 10,316,832 | B2 | 6/2019 | Byrne |
| 10,317,875 | B2 | 6/2019 | Pandurangan et al. |
| 10,329,888 | B2 | 6/2019 | Urbancic et al. |
| 10,337,402 | B2 | 7/2019 | Austin et al. |
| 10,358,035 | B2 | 7/2019 | Cryer et al. |
| 10,371,012 | B2 | 8/2019 | Davis et al. |
| 10,374,485 | B2 | 8/2019 | Morris et al. |
| 10,378,326 | B2 | 8/2019 | Morris et al. |
| 10,393,108 | B2 | 8/2019 | Chong et al. |
| 10,407,990 | B2 | 9/2019 | Oehring et al. |
| 10,408,031 | B2 | 9/2019 | Oehring et al. |
| 10,415,348 | B2 | 9/2019 | Zhang et al. |
| 10,415,557 | B1 | 9/2019 | Crowe et al. |
| 10,415,562 | B2 | 9/2019 | Kajita et al. |
| 10,422,207 | B2 | 9/2019 | Aidagulov et al. |
| RE47,695 | E | 11/2019 | Case et al. |
| 10,465,689 | B2 | 11/2019 | Crom |
| 10,478,753 | B1 | 11/2019 | Elms et al. |
| 10,526,882 | B2 | 1/2020 | Oehring et al. |
| 10,563,649 | B2 | 2/2020 | Zhang et al. |
| 10,570,704 | B2 | 2/2020 | Colvin et al. |
| 10,577,908 | B2 | 3/2020 | Kisra et al. |
| 10,577,910 | B2 | 3/2020 | Stephenson |
| 10,584,645 | B2 | 3/2020 | Nakagawa et al. |
| 10,590,867 | B2 | 3/2020 | Thomassin et al. |
| 10,598,258 | B2 | 3/2020 | Oehring et al. |
| 10,605,060 | B2 | 3/2020 | Chuprakov et al. |
| 10,610,842 | B2 | 4/2020 | Chong |
| 10,662,749 | B1 | 5/2020 | Hill et al. |
| 10,677,961 | B1 | 6/2020 | Chen et al. |
| 10,711,787 | B1 | 7/2020 | Darley |
| 10,738,580 | B1 | 8/2020 | Fischer et al. |
| 10,753,153 | B1 | 8/2020 | Fischer et al. |
| 10,753,165 | B1 | 8/2020 | Fischer et al. |
| 10,760,416 | B2 | 9/2020 | Weng et al. |
| 10,760,556 | B1 | 9/2020 | Crom et al. |
| 10,794,165 | B2 | 10/2020 | Fischer et al. |
| 10,794,166 | B2 | 10/2020 | Reckels et al. |
| 10,801,311 | B1 | 10/2020 | Cui et al. |
| 10,815,764 | B1 | 10/2020 | Yeung et al. |
| 10,815,978 | B2 | 10/2020 | Glass |
| 10,830,032 | B1 | 11/2020 | Zhang et al. |
| 10,830,225 | B2 | 11/2020 | Repaci |
| 10,851,633 | B2 | 12/2020 | Harper |
| 10,859,203 | B1 | 12/2020 | Cui et al. |
| 10,864,487 | B1 | 12/2020 | Han et al. |
| 10,865,624 | B1 | 12/2020 | Cui et al. |
| 10,865,631 | B1 | 12/2020 | Zhang et al. |
| 10,870,093 | B1 | 12/2020 | Zhong et al. |
| 10,871,045 | B2 | 12/2020 | Fischer et al. |
| 10,892,596 | B2 | 1/2021 | Enya et al. |
| 10,895,202 | B1 | 1/2021 | Yeung et al. |
| 10,900,475 | B2 | 1/2021 | Weightman et al. |
| 10,907,459 | B1 | 2/2021 | Yeung et al. |
| 10,914,139 | B2 | 2/2021 | Shahri et al. |
| 10,920,538 | B2 | 2/2021 | Rodriguez Herrera et al. |
| 10,920,552 | B2 | 2/2021 | Rodriguez Herrera et al. |
| 10,927,774 | B2 | 2/2021 | Cai et al. |
| 10,927,802 | B2 | 2/2021 | Oehring et al. |
| 10,954,770 | B1 | 3/2021 | Yeung et al. |
| 10,954,855 | B1 | 3/2021 | Ji et al. |
| 10,961,614 | B1 | 3/2021 | Djavanroodi |
| 10,961,908 | B1 | 3/2021 | Yeung et al. |
| 10,961,912 | B1 | 3/2021 | Yeung et al. |
| 10,961,914 | B1 | 3/2021 | Yeung et al. |
| 10,961,993 | B1 | 3/2021 | Ji et al. |
| 10,961,995 | B2 | 3/2021 | Mayorca |
| 10,968,837 | B1 | 4/2021 | Yeung et al. |
| 10,982,523 | B1 | 4/2021 | Hill et al. |
| 10,989,019 | B2 | 4/2021 | Cai et al. |
| 10,989,180 | B2 | 4/2021 | Yeung et al. |
| 10,995,564 | B2 | 5/2021 | Miller et al. |
| 11,002,189 | B2 | 5/2021 | Yeung et al. |
| 11,008,950 | B2 | 5/2021 | Ethier et al. |
| 11,015,423 | B1 | 5/2021 | Yeung et al. |
| 11,015,536 | B2 | 5/2021 | Yeung et al. |
| 11,015,594 | B2 | 5/2021 | Yeung et al. |
| 11,022,526 | B1 | 6/2021 | Yeung et al. |
| 11,028,677 | B1 | 6/2021 | Yeung et al. |
| 11,035,213 | B2 | 6/2021 | Dusterhoft et al. |
| 11,035,214 | B2 | 6/2021 | Cui et al. |
| 11,047,379 | B1 | 6/2021 | Li et al. |
| 11,053,853 | B2 | 7/2021 | Li et al. |
| 11,060,455 | B1 | 7/2021 | Yeung et al. |
| 11,066,915 | B1 | 7/2021 | Yeung et al. |
| 11,068,455 | B2 | 7/2021 | Shabi et al. |
| 11,085,281 | B1 | 8/2021 | Yeung et al. |
| 11,085,282 | B2 | 8/2021 | Mazrooee et al. |
| 11,092,152 | B2 | 8/2021 | Yeung et al. |
| 11,098,651 | B1 | 8/2021 | Yeung et al. |
| 11,105,250 | B1 | 8/2021 | Zhang et al. |
| 11,105,266 | B2 | 8/2021 | Zhou et al. |
| 11,109,508 | B1 | 8/2021 | Yeung et al. |
| 11,111,768 | B1 | 9/2021 | Yeung et al. |
| 11,125,066 | B1 | 9/2021 | Yeung et al. |
| 11,125,156 | B2 | 9/2021 | Zhang et al. |
| 11,129,295 | B1 | 9/2021 | Yeung et al. |
| 11,143,000 | B2 | 10/2021 | Li et al. |
| 11,143,005 | B2 | 10/2021 | Dusterhoft et al. |
| 11,143,006 | B1 | 10/2021 | Zhang et al. |
| 11,149,533 | B1 | 10/2021 | Yeung et al. |
| 11,149,726 | B1 | 10/2021 | Yeung et al. |
| 11,156,159 | B1 | 10/2021 | Yeung et al. |
| 11,168,681 | B2 | 11/2021 | Boguski et al. |

(56) References Cited

U.S. PATENT DOCUMENTS 11,174,716 B1 11/2021 Yeung et al.
11,193,360 B1 12/2021 Yeung et al.
11,193,361 B1 12/2021 Yeung et al.
11,205,880 B1 12/2021 Zhou
11,205,881 B2 12/2021 Makino
11,208,879 B1 12/2021 Yeung et al.
11,208,953 B1 12/2021 Yeung et al.
11,220,895 B1 1/2022 Yeung et al.
11,236,739 B2 2/2022 Yeung et al.
11,242,737 B2 2/2022 Zhang et al.
11,243,509 B2 2/2022 Cai et al.
11,251,650 B1 2/2022 Liu et al.
11,261,717 B2 3/2022 Yeung et al.
11,268,346 B2 3/2022 Yeung et al.
11,280,266 B2 3/2022 Yeung et al.
11,306,835 B1 4/2022 Dille et al.
RE49,083 E 5/2022 Case et al.
11,319,791 B2 * 5/2022 Yeung .................... E21B 21/08
11,339,638 B1 5/2022 Yeung et al.
11,346,200 B2 5/2022 Cai et al.
11,373,058 B2 6/2022 Jaaskelainen et al.
RE49,140 E 7/2022 Case et al.
11,377,943 B2 7/2022 Kriebel et al.
RE49,155 E 8/2022 Case et al.
RE49,156 E 8/2022 Case et al.
11,401,927 B2 8/2022 Li et al.
11,428,165 B2 8/2022 Yeung et al.
11,441,483 B2 9/2022 Li et al.
11,448,122 B2 9/2022 Feng et al.
11,466,680 B2 10/2022 Yeung et al.
11,480,040 B2 10/2022 Han et al.
11,492,887 B2 11/2022 Cui et al.
11,499,405 B2 11/2022 Zhang et al.
11,506,039 B2 11/2022 Zhang et al.
11,512,570 B2 11/2022 Yeung et al.
11,519,395 B2 12/2022 Zhang et al.
11,519,405 B2 12/2022 Deng et al.
11,530,602 B2 12/2022 Yeung et al.
11,549,349 B2 1/2023 Wang et al.
11,555,390 B2 1/2023 Cui et al.
11,555,756 B2 1/2023 Yeung et al.
11,557,887 B2 1/2023 Ji et al.
11,560,779 B2 1/2023 Mao et al.
11,560,845 B2 1/2023 Yeung et al.
11,572,775 B2 2/2023 Mao et al.
11,575,249 B2 2/2023 Ji et al.
11,592,020 B2 2/2023 Chang et al.
11,596,047 B2 2/2023 Liu et al.
11,598,263 B2 3/2023 Yeung et al.
11,603,797 B2 3/2023 Zhang et al.
11,607,982 B2 3/2023 Tian et al.
11,608,726 B2 3/2023 Zhang et al.
11,624,326 B2 4/2023 Yeung et al.
11,629,583 B2 4/2023 Yeung et al.
11,629,589 B2 4/2023 Lin et al.
11,649,766 B1 5/2023 Yeung et al.
11,649,819 B2 5/2023 Gillispie
11,662,384 B2 5/2023 Liu et al.
11,668,173 B2 6/2023 Zhang et al.
11,668,289 B2 6/2023 Chang et al.
11,677,238 B2 6/2023 Liu et al.
2002/0126922 A1 9/2002 Cheng et al.
2002/0197176 A1 12/2002 Kondo
2003/0031568 A1 2/2003 Stiefel
2003/0061819 A1 4/2003 Kuroki et al.
2003/0161212 A1 8/2003 Neal et al.
2004/0016245 A1 1/2004 Pierson
2004/0074238 A1 4/2004 Wantanabe et al.
2004/0076526 A1 4/2004 Fukano et al.
2004/0187950 A1 9/2004 Cohen et al.
2004/0219040 A1 11/2004 Kugelev et al.
2005/0051322 A1 3/2005 Speer
2005/0056081 A1 3/2005 Gocho
2005/0139286 A1 6/2005 Poulter et al.
2005/0196298 A1 9/2005 Manning
2005/0226754 A1 10/2005 Orr et al.
2005/0274134 A1 12/2005 Ryu et al.
2006/0061091 A1 3/2006 Osterloh
2006/0062914 A1 3/2006 Garg et al.
2006/0155473 A1 7/2006 Soliman et al.
2006/0196251 A1 9/2006 Richey
2006/0211356 A1 9/2006 Grassman
2006/0228225 A1 10/2006 Rogers
2006/0260331 A1 11/2006 Andreychuk
2006/0272333 A1 12/2006 Sundin
2007/0029090 A1 2/2007 Andreychuk et al.
2007/0041848 A1 2/2007 Wood et al.
2007/0066406 A1 3/2007 Keller et al.
2007/0098580 A1 5/2007 Petersen
2007/0107981 A1 5/2007 Sicotte
2007/0125544 A1 6/2007 Robinson et al.
2007/0169543 A1 7/2007 Fazekas
2007/0181212 A1 8/2007 Fell
2007/0272407 A1 11/2007 Lehman et al.
2007/0277982 A1 12/2007 Shampine et al.
2007/0295569 A1 12/2007 Manzoor et al.
2008/0006089 A1 1/2008 Adnan et al.
2008/0041594 A1 2/2008 Boles et al.
2008/0098891 A1 5/2008 Feher et al.
2008/0161974 A1 7/2008 Alston
2008/0212275 A1 9/2008 Waryck et al.
2008/0229757 A1 9/2008 Alexander et al.
2008/0264625 A1 10/2008 Ochoa
2008/0264649 A1 10/2008 Crawford
2008/0298982 A1 12/2008 Pabst et al.
2009/0053072 A1 2/2009 Borgstadt et al.
2009/0064685 A1 3/2009 Busekros et al.
2009/0068031 A1 3/2009 Gambier et al.
2009/0092510 A1 4/2009 Williams et al.
2009/0124191 A1 5/2009 Van Becelaere
2009/0178412 A1 7/2009 Spytek
2009/0212630 A1 8/2009 Flegel et al.
2009/0249794 A1 10/2009 Wilkes et al.
2009/0252616 A1 10/2009 Brunet et al.
2009/0308602 A1 12/2009 Bruins et al.
2010/0019626 A1 1/2010 Stout et al.
2010/0071899 A1 3/2010 Coquilleau et al.
2010/0218508 A1 9/2010 Brown et al.
2010/0224365 A1 9/2010 Abad
2010/0300683 A1 12/2010 Looper et al.
2010/0310384 A1 12/2010 Stephenson et al.
2011/0030963 A1 2/2011 Demong et al.
2011/0041681 A1 2/2011 Duerr
2011/0052423 A1 3/2011 Gambier et al.
2011/0054704 A1 3/2011 Karpman et al.
2011/0067857 A1 3/2011 Underhill et al.
2011/0085924 A1 4/2011 Shampine et al.
2011/0120702 A1 5/2011 Craig
2011/0120705 A1 5/2011 Walters et al.
2011/0120706 A1 5/2011 Craig
2011/0120718 A1 5/2011 Craig
2011/0125471 A1 5/2011 Craig et al.
2011/0125476 A1 5/2011 Craig
2011/0146244 A1 6/2011 Farman et al.
2011/0146246 A1 6/2011 Farman et al.
2011/0173991 A1 7/2011 Dean et al.
2011/0197988 A1 8/2011 Van Vliet et al.
2011/0241888 A1 10/2011 Lu et al.
2011/0265443 A1 11/2011 Ansari et al.
2011/0272158 A1 11/2011 Neal
2012/0023973 A1 2/2012 Mayorca
2012/0048242 A1 3/2012 Surnilla et al.
2012/0085541 A1 4/2012 Love et al.
2012/0137699 A1 6/2012 Montagne et al.
2012/0179444 A1 7/2012 Ganguly et al.
2012/0192542 A1 8/2012 Chillar et al.
2012/0199001 A1 8/2012 Chillar et al.
2012/0204627 A1 8/2012 Anderl et al.
2012/0255734 A1 10/2012 Coli et al.
2012/0310509 A1 12/2012 Pardo et al.
2012/0324903 A1 12/2012 Dewis et al.
2013/0068307 A1 3/2013 Hains et al.
2013/0087045 A1 4/2013 Sullivan et al.
2013/0087945 A1 4/2013 Kusters et al.

(56) References Cited

U.S. PATENT DOCUMENTS

2013/0134702 A1 5/2013 Boraas et al.
2013/0140031 A1 6/2013 Cohen et al.
2013/0189915 A1 7/2013 Hazard
2013/0205798 A1 8/2013 Kwok et al.
2013/0233165 A1 9/2013 Matzner et al.
2013/0255953 A1 10/2013 Tudor
2013/0259707 A1 10/2013 Yin
2013/0284455 A1 10/2013 Kajaria et al.
2013/0300341 A1 11/2013 Gillette, II
2013/0306322 A1 11/2013 Sanborn et al.
2014/0000668 A1 1/2014 Lessard
2014/0010671 A1 1/2014 Cryer et al.
2014/0013768 A1 1/2014 Laing et al.
2014/0032082 A1 1/2014 Gehrke et al.
2014/0044517 A1 2/2014 Saha et al.
2014/0048253 A1 2/2014 Andreychuk
2014/0090729 A1 4/2014 Coulter et al.
2014/0090742 A1 4/2014 Coskrey et al.
2014/0094105 A1 4/2014 Lundh et al.
2014/0095114 A1 4/2014 Thomeer et al.
2014/0095554 A1 4/2014 Thomeer et al.
2014/0123621 A1 5/2014 Driessens et al.
2014/0130422 A1 5/2014 Laing et al.
2014/0138079 A1 5/2014 Broussard et al.
2014/0144641 A1 5/2014 Chandler
2014/0147291 A1 5/2014 Burnette
2014/0158345 A1 6/2014 Jang et al.
2014/0174097 A1 6/2014 Hammer et al.
2014/0196459 A1 7/2014 Futa et al.
2014/0216736 A1 8/2014 Leugemors et al.
2014/0219824 A1 8/2014 Burnette
2014/0250845 A1 9/2014 Jackson et al.
2014/0251623 A1 9/2014 Lestz et al.
2014/0262232 A1 9/2014 Dusterhoft et al.
2014/0277772 A1 9/2014 Lopez et al.
2014/0290266 A1 10/2014 Veilleux, Jr. et al.
2014/0318638 A1 10/2014 Harwood et al.
2014/0322050 A1 10/2014 Marette et al.
2015/0027730 A1 1/2015 Hall et al.
2015/0075778 A1 3/2015 Walters et al.
2015/0078924 A1 3/2015 Zhang et al.
2015/0096739 A1 4/2015 Ghasripoor et al.
2015/0101344 A1 4/2015 Jarrier et al.
2015/0114652 A1 4/2015 Lestz et al.
2015/0129210 A1 5/2015 Chong et al.
2015/0135659 A1 5/2015 Jarrier et al.
2015/0159553 A1 6/2015 Kippel et al.
2015/0176387 A1 6/2015 Wutherich
2015/0192117 A1 7/2015 Bridges
2015/0204148 A1 7/2015 Liu et al.
2015/0204174 A1 7/2015 Kresse et al.
2015/0204322 A1 7/2015 Iund et al.
2015/0211512 A1 7/2015 Wiegman et al.
2015/0214816 A1 7/2015 Raad
2015/0217672 A1 8/2015 Shampine et al.
2015/0226140 A1 8/2015 Zhang et al.
2015/0252661 A1 9/2015 Glass
2015/0275891 A1 10/2015 Chong
2015/0337730 A1 11/2015 Kupiszewski et al.
2015/0340864 A1 11/2015 Compton
2015/0345385 A1 12/2015 Santini
2015/0369351 A1 12/2015 Hermann et al.
2016/0032703 A1 2/2016 Broussard et al.
2016/0032836 A1 2/2016 Hawkinson et al.
2016/0076447 A1 3/2016 Merlo et al.
2016/0090823 A1 3/2016 Alzahabi et al.
2016/0102581 A1 4/2016 Del Bono
2016/0105022 A1 4/2016 Oehring et al.
2016/0108705 A1 4/2016 Maxwell et al.
2016/0108713 A1 4/2016 Dunaeva et al.
2016/0123185 A1 5/2016 Le Pache et al.
2016/0168979 A1 6/2016 Zhang et al.
2016/0177675 A1 6/2016 Morris et al.
2016/0177945 A1 6/2016 Byrne et al.
2016/0186671 A1 6/2016 Austin et al.
2016/0195082 A1 7/2016 Wiegman et al.
2016/0215774 A1 7/2016 Oklejas et al.
2016/0230525 A1 8/2016 Lestz et al.
2016/0244314 A1 8/2016 Van Vliet et al.
2016/0248230 A1 8/2016 Tawy et al.
2016/0253634 A1 9/2016 Thomeer et al.
2016/0258267 A1 9/2016 Payne et al.
2016/0265330 A1 9/2016 Mazrooee et al.
2016/0265331 A1 9/2016 Weng et al.
2016/0273328 A1 9/2016 Oehring
2016/0273346 A1 9/2016 Tang et al.
2016/0290114 A1 10/2016 Oehring et al.
2016/0319650 A1 11/2016 Oehring et al.
2016/0326845 A1 11/2016 Djikpesse et al.
2016/0348479 A1 12/2016 Oehring et al.
2016/0369609 A1 12/2016 Morris et al.
2017/0009905 A1 1/2017 Arnold
2017/0016433 A1 1/2017 Chong et al.
2017/0030177 A1 2/2017 Oehring et al.
2017/0038137 A1 2/2017 Turney
2017/0045055 A1 2/2017 Hoefel et al.
2017/0051598 A1 2/2017 Ouenes
2017/0052087 A1 2/2017 Faqihi et al.
2017/0074074 A1 3/2017 Joseph et al.
2017/0074076 A1 3/2017 Joseph et al.
2017/0074089 A1 3/2017 Agarwal et al.
2017/0082110 A1 3/2017 Lammers
2017/0089189 A1 3/2017 Norris et al.
2017/0114613 A1 4/2017 Lecerf et al.
2017/0114625 A1 4/2017 Norris et al.
2017/0122310 A1 5/2017 Ladrón de Guevara
2017/0131174 A1 5/2017 Enev et al.
2017/0145918 A1 5/2017 Oehring et al.
2017/0177992 A1 6/2017 Klie
2017/0191350 A1 7/2017 Johns et al.
2017/0218727 A1 8/2017 Oehring et al.
2017/0226839 A1 8/2017 Broussard et al.
2017/0226842 A1 8/2017 Omont et al.
2017/0226998 A1 8/2017 Zhang et al.
2017/0227002 A1 8/2017 Mikulski et al.
2017/0233103 A1 8/2017 Teicholz et al.
2017/0234165 A1 8/2017 Kersey et al.
2017/0234308 A1 8/2017 Buckley
2017/0241336 A1 8/2017 Jones et al.
2017/0241671 A1 8/2017 Ahmad
2017/0247995 A1 8/2017 Crews et al.
2017/0248034 A1 8/2017 Dzieciol et al.
2017/0248208 A1 8/2017 Tamura
2017/0248308 A1 8/2017 Makarychev-Mikhailov et al.
2017/0254186 A1 9/2017 Aidagulov et al.
2017/0275149 A1 9/2017 Schmidt
2017/0288400 A1 10/2017 Williams
2017/0292409 A1 10/2017 Aguilar et al.
2017/0302135 A1 10/2017 Cory
2017/0305736 A1 10/2017 Haile et al.
2017/0306847 A1 10/2017 Suciu et al.
2017/0306936 A1 10/2017 Dole et al.
2017/0322086 A1 11/2017 Luharuka et al.
2017/0328179 A1 11/2017 Dykstra et al.
2017/0333086 A1 11/2017 Jackson
2017/0334448 A1 11/2017 Schwunk
2017/0335842 A1 11/2017 Robinson et al.
2017/0350471 A1 12/2017 Steidl et al.
2017/0356470 A1 12/2017 Jaffrey
2017/0370199 A1 12/2017 Witkowski et al.
2017/0370480 A1 12/2017 Witkowski et al.
2018/0016895 A1 1/2018 Weng et al.
2018/0034280 A1 2/2018 Pedersen
2018/0038216 A1 2/2018 Zhang et al.
2018/0038328 A1 2/2018 Louven et al.
2018/0041093 A1 2/2018 Miranda
2018/0045202 A1 2/2018 Crom
2018/0058171 A1 3/2018 Roesner et al.
2018/0087499 A1 3/2018 Zhang et al.
2018/0087996 A1 3/2018 De La Cruz
2018/0149000 A1 5/2018 Roussel et al.
2018/0156210 A1 6/2018 Oehring et al.
2018/0172294 A1 6/2018 Owen
2018/0183219 A1 6/2018 Oehring et al.

(56) References Cited

U.S. PATENT DOCUMENTS

| | | | |
|---|---|---|---|
| 2018/0186442 | A1 | 7/2018 | Maier |
| 2018/0187662 | A1 | 7/2018 | Hill et al. |
| 2018/0209415 | A1 | 7/2018 | Zhang et al. |
| 2018/0223640 | A1 | 8/2018 | Keihany et al. |
| 2018/0224044 | A1 | 8/2018 | Penney et al. |
| 2018/0229998 | A1 | 8/2018 | Shock |
| 2018/0230780 | A1 | 8/2018 | Klenner et al. |
| 2018/0252084 | A1 | 9/2018 | Nguyen et al. |
| 2018/0258746 | A1 | 9/2018 | Broussard et al. |
| 2018/0266412 | A1 | 9/2018 | Stokkevåg et al. |
| 2018/0278124 | A1 | 9/2018 | Oehring et al. |
| 2018/0283102 | A1 | 10/2018 | Cook |
| 2018/0283618 | A1 | 10/2018 | Cook |
| 2018/0284817 | A1 | 10/2018 | Cook et al. |
| 2018/0290877 | A1 | 10/2018 | Shock |
| 2018/0291781 | A1 | 10/2018 | Pedrini |
| 2018/0298731 | A1 | 10/2018 | Bishop |
| 2018/0298735 | A1 | 10/2018 | Conrad |
| 2018/0307255 | A1 | 10/2018 | Bishop |
| 2018/0313456 | A1 | 11/2018 | Bayyouk et al. |
| 2018/0328157 | A1 | 11/2018 | Bishop |
| 2018/0334893 | A1 | 11/2018 | Oehring |
| 2018/0363435 | A1 | 12/2018 | Coli et al. |
| 2018/0363436 | A1 | 12/2018 | Coli et al. |
| 2018/0363437 | A1 | 12/2018 | Coli et al. |
| 2018/0363438 | A1 | 12/2018 | Coli et al. |
| 2019/0003272 | A1 | 1/2019 | Morris et al. |
| 2019/0003329 | A1 | 1/2019 | Morris et al. |
| 2019/0010793 | A1 | 1/2019 | Hinderliter |
| 2019/0011051 | A1 | 1/2019 | Yeung |
| 2019/0048993 | A1 | 2/2019 | Akiyama et al. |
| 2019/0055836 | A1 | 2/2019 | Felkl et al. |
| 2019/0063263 | A1 | 2/2019 | Davis et al. |
| 2019/0063341 | A1 | 2/2019 | Davis |
| 2019/0067991 | A1 | 2/2019 | Davis et al. |
| 2019/0071946 | A1 | 3/2019 | Painter et al. |
| 2019/0071992 | A1 | 3/2019 | Feng |
| 2019/0072005 | A1 | 3/2019 | Fisher et al. |
| 2019/0078471 | A1 | 3/2019 | Braglia et al. |
| 2019/0088845 | A1 | 3/2019 | Sugi et al. |
| 2019/0091619 | A1 | 3/2019 | Huang |
| 2019/0106316 | A1 | 4/2019 | Van Vliet et al. |
| 2019/0106970 | A1 | 4/2019 | Oehring |
| 2019/0112908 | A1 | 4/2019 | Coli et al. |
| 2019/0112910 | A1 | 4/2019 | Oehring et al. |
| 2019/0119096 | A1 | 4/2019 | Haile et al. |
| 2019/0120024 | A1 | 4/2019 | Oehring et al. |
| 2019/0120031 | A1 | 4/2019 | Gilje |
| 2019/0120134 | A1 | 4/2019 | Goleczka et al. |
| 2019/0128247 | A1 | 5/2019 | Douglas, III |
| 2019/0128288 | A1 | 5/2019 | Konada et al. |
| 2019/0131607 | A1 | 5/2019 | Gillette |
| 2019/0136677 | A1 | 5/2019 | Shampine et al. |
| 2019/0136684 | A1 | 5/2019 | Felkl et al. |
| 2019/0153843 | A1 | 5/2019 | Headrick |
| 2019/0153938 | A1 | 5/2019 | Hammoud |
| 2019/0154020 | A1 | 5/2019 | Glass |
| 2019/0155318 | A1 | 5/2019 | Meunier |
| 2019/0169962 | A1 | 6/2019 | Aqrawi et al. |
| 2019/0178234 | A1 | 6/2019 | Beisel |
| 2019/0178235 | A1 | 6/2019 | Coskrey et al. |
| 2019/0185312 | A1 | 6/2019 | Bush et al. |
| 2019/0203572 | A1 | 7/2019 | Morris et al. |
| 2019/0204021 | A1 | 7/2019 | Morris et al. |
| 2019/0211661 | A1 | 7/2019 | Reckels et al. |
| 2019/0211814 | A1 | 7/2019 | Weightman et al. |
| 2019/0217258 | A1 | 7/2019 | Bishop |
| 2019/0226317 | A1 | 7/2019 | Payne et al. |
| 2019/0245348 | A1 | 8/2019 | Hinderliter et al. |
| 2019/0249652 | A1 | 8/2019 | Stephenson et al. |
| 2019/0249754 | A1 | 8/2019 | Oehring et al. |
| 2019/0257297 | A1 | 8/2019 | Botting et al. |
| 2019/0264667 | A1 | 8/2019 | Byrne |
| 2019/0277279 | A1 | 9/2019 | Byrne et al. |
| 2019/0277295 | A1 | 9/2019 | Clyburn et al. |
| 2019/0309585 | A1 | 10/2019 | Miller et al. |
| 2019/0316447 | A1 | 10/2019 | Oehring et al. |
| 2019/0316456 | A1 | 10/2019 | Beisel et al. |
| 2019/0323337 | A1 | 10/2019 | Glass et al. |
| 2019/0330923 | A1 | 10/2019 | Gable et al. |
| 2019/0331117 | A1 | 10/2019 | Gable et al. |
| 2019/0337392 | A1 | 11/2019 | Joshi et al. |
| 2019/0338762 | A1 | 11/2019 | Curry et al. |
| 2019/0345920 | A1 | 11/2019 | Surjaatmadja et al. |
| 2019/0353103 | A1 | 11/2019 | Roberge |
| 2019/0356199 | A1 | 11/2019 | Morris et al. |
| 2019/0376449 | A1 | 12/2019 | Carrell |
| 2019/0383123 | A1 | 12/2019 | Hinderliter |
| 2020/0003205 | A1 | 1/2020 | Stokkevåg et al. |
| 2020/0011165 | A1 | 1/2020 | George et al. |
| 2020/0040878 | A1 | 2/2020 | Morris |
| 2020/0049136 | A1 | 2/2020 | Stephenson |
| 2020/0049153 | A1 | 2/2020 | Headrick et al. |
| 2020/0071998 | A1 | 3/2020 | Oehring et al. |
| 2020/0072201 | A1 | 3/2020 | Marica |
| 2020/0088202 | A1 | 3/2020 | Sigmar et al. |
| 2020/0095854 | A1 | 3/2020 | Hinderliter |
| 2020/0109610 | A1 | 4/2020 | Husøy et al. |
| 2020/0109616 | A1 | 4/2020 | Oehring et al. |
| 2020/0132058 | A1 | 4/2020 | Mollatt |
| 2020/0141219 | A1 | 5/2020 | Oehring et al. |
| 2020/0141326 | A1 | 5/2020 | Redford et al. |
| 2020/0141907 | A1 | 5/2020 | Meck et al. |
| 2020/0166026 | A1 | 5/2020 | Marica |
| 2020/0206704 | A1 | 7/2020 | Chong |
| 2020/0208733 | A1 | 7/2020 | Kim |
| 2020/0223648 | A1 | 7/2020 | Herman et al. |
| 2020/0224645 | A1 | 7/2020 | Buckley |
| 2020/0225381 | A1 | 7/2020 | Walles et al. |
| 2020/0232454 | A1 | 7/2020 | Chretien et al. |
| 2020/0256333 | A1 | 8/2020 | Surjaatmadja et al. |
| 2020/0263498 | A1 | 8/2020 | Fischer et al. |
| 2020/0263525 | A1 | 8/2020 | Reid et al. |
| 2020/0263526 | A1 | 8/2020 | Fischer et al. |
| 2020/0263527 | A1 | 8/2020 | Fischer et al. |
| 2020/0263528 | A1 | 8/2020 | Fischer et al. |
| 2020/0267888 | A1 | 8/2020 | Putz |
| 2020/0291731 | A1 | 9/2020 | Haiderer et al. |
| 2020/0295574 | A1 | 9/2020 | Batsch-Smith |
| 2020/0300050 | A1 | 9/2020 | Oehring et al. |
| 2020/0309027 | A1 | 10/2020 | Rytkönen |
| 2020/0309113 | A1 | 10/2020 | Hunter et al. |
| 2020/0325752 | A1 | 10/2020 | Clark et al. |
| 2020/0325760 | A1 | 10/2020 | Markham |
| 2020/0325761 | A1 | 10/2020 | Williams |
| 2020/0325791 | A1 | 10/2020 | Himmelmann |
| 2020/0325893 | A1 | 10/2020 | Kraige et al. |
| 2020/0332784 | A1 | 10/2020 | Zhang et al. |
| 2020/0332788 | A1 | 10/2020 | Cui et al. |
| 2020/0340313 | A1 | 10/2020 | Fischer et al. |
| 2020/0340322 | A1 | 10/2020 | Sizemore et al. |
| 2020/0340340 | A1 | 10/2020 | Oehring et al. |
| 2020/0340344 | A1 | 10/2020 | Reckels et al. |
| 2020/0340404 | A1 | 10/2020 | Stockstill et al. |
| 2020/0347725 | A1 | 11/2020 | Morris et al. |
| 2020/0354928 | A1 | 11/2020 | Wehler et al. |
| 2020/0355055 | A1 | 11/2020 | Dusterhoft et al. |
| 2020/0362760 | A1 | 11/2020 | Morenko et al. |
| 2020/0362764 | A1 | 11/2020 | Saintignan et al. |
| 2020/0370394 | A1 | 11/2020 | Cai et al. |
| 2020/0370408 | A1 | 11/2020 | Cai et al. |
| 2020/0370429 | A1 | 11/2020 | Cai et al. |
| 2020/0371490 | A1 | 11/2020 | Cai et al. |
| 2020/0386169 | A1 | 12/2020 | Hinderliter et al. |
| 2020/0386222 | A1 | 12/2020 | Pham et al. |
| 2020/0388140 | A1 | 12/2020 | Gomez et al. |
| 2020/0392826 | A1 | 12/2020 | Cui et al. |
| 2020/0392827 | A1 | 12/2020 | George et al. |
| 2020/0393088 | A1 | 12/2020 | Sizemore et al. |
| 2020/0398238 | A1 | 12/2020 | Zhong et al. |
| 2020/0400000 | A1 | 12/2020 | Ghasripoor et al. |
| 2020/0400005 | A1 | 12/2020 | Han et al. |
| 2020/0407625 | A1 | 12/2020 | Stephenson |
| 2020/0408071 | A1 | 12/2020 | Li et al. |

(56) References Cited

U.S. PATENT DOCUMENTS

2020/0408144 A1 12/2020 Feng et al.
2020/0408147 A1 12/2020 Zhang et al.
2020/0408149 A1 12/2020 Li et al.
2021/0010361 A1 1/2021 Kriebel et al.
2021/0010362 A1 1/2021 Kriebel et al.
2021/0025324 A1 1/2021 Morris et al.
2021/0025383 A1 1/2021 Bodishbaugh et al.
2021/0032961 A1 2/2021 Hinderliter et al.
2021/0054727 A1 2/2021 Floyd
2021/0071503 A1 3/2021 Ogg et al.
2021/0071574 A1 3/2021 Feng et al.
2021/0071579 A1 3/2021 Li et al.
2021/0071654 A1 3/2021 Brunson, Jr.
2021/0071752 A1 3/2021 Cui et al.
2021/0079758 A1 3/2021 Yeung et al.
2021/0079851 A1 3/2021 Yeung et al.
2021/0086851 A1 3/2021 Zhang et al.
2021/0087883 A1 3/2021 Zhang et al.
2021/0087916 A1 3/2021 Zhang et al.
2021/0087925 A1 3/2021 Heidari et al.
2021/0087943 A1 3/2021 Cui et al.
2021/0088042 A1 3/2021 Zhang et al.
2021/0123425 A1 4/2021 Cui et al.
2021/0123434 A1 4/2021 Cui et al.
2021/0123435 A1 4/2021 Cui et al.
2021/0131409 A1 5/2021 Cui et al.
2021/0140416 A1 5/2021 Buckley
2021/0148208 A1 5/2021 Thomas et al.
2021/0156240 A1 5/2021 Cicci et al.
2021/0156241 A1 5/2021 Cook
2021/0172282 A1 6/2021 Wang et al.
2021/0180517 A1 6/2021 Zhou et al.
2021/0190045 A1 6/2021 Zhang et al.
2021/0199110 A1 7/2021 Albert et al.
2021/0222690 A1 7/2021 Beisel
2021/0239112 A1 8/2021 Buckley
2021/0246774 A1 8/2021 Cui et al.
2021/0270261 A1 9/2021 Zhang et al.
2021/0270264 A1 9/2021 Byrne et al.
2021/0285311 A1 9/2021 Ji et al.
2021/0285432 A1 9/2021 Ji et al.
2021/0301807 A1 9/2021 Cui et al.
2021/0301815 A1 9/2021 Chretien et al.
2021/0306720 A1 9/2021 Sandoval et al.
2021/0308638 A1 10/2021 Zhong et al.
2021/0324718 A1 10/2021 Anders
2021/0348475 A1 11/2021 Yeung et al.
2021/0348476 A1 11/2021 Yeung et al.
2021/0348477 A1 11/2021 Yeung et al.
2021/0355927 A1 11/2021 Jian et al.
2021/0372394 A1 12/2021 Bagulayan et al.
2021/0372395 A1 12/2021 Li et al.
2021/0376413 A1 12/2021 Asfha
2021/0388760 A1 12/2021 Feng et al.
2022/0082007 A1 3/2022 Zhang et al.
2022/0090476 A1 3/2022 Zhang et al.
2022/0090477 A1 3/2022 Zhang et al.
2022/0090478 A1 3/2022 Zhang et al.
2022/0112892 A1 4/2022 Cui et al.
2022/0120262 A1 4/2022 Ji et al.
2022/0145740 A1 5/2022 Yuan et al.
2022/0154775 A1 5/2022 Liu et al.
2022/0155373 A1 5/2022 Liu et al.
2022/0162931 A1 5/2022 Zhong et al.
2022/0162991 A1 5/2022 Zhang et al.
2022/0181859 A1 6/2022 Ji et al.
2022/0186724 A1 6/2022 Chang et al.
2022/0213777 A1 7/2022 Cui et al.
2022/0220836 A1 7/2022 Zhang et al.
2022/0224087 A1 7/2022 Ji et al.
2022/0228468 A1 7/2022 Cui et al.
2022/0228469 A1 7/2022 Zhang et al.
2022/0235639 A1 7/2022 Zhang et al.
2022/0235640 A1 7/2022 Mao et al.
2022/0235641 A1 7/2022 Zhang et al.
2022/0235642 A1 7/2022 Zhang et al.
2022/0235802 A1 7/2022 Jiang et al.
2022/0242297 A1 8/2022 Tian et al.
2022/0243613 A1 8/2022 Ji et al.
2022/0243724 A1 8/2022 Li et al.
2022/0250000 A1 8/2022 Zhang et al.
2022/0255319 A1 8/2022 Liu et al.
2022/0258659 A1 8/2022 Cui et al.
2022/0259947 A1 8/2022 Li et al.
2022/0259964 A1 8/2022 Zhang et al.
2022/0268201 A1 8/2022 Feng et al.
2022/0282606 A1 9/2022 Zhong et al.
2022/0282726 A1 9/2022 Zhang et al.
2022/0290549 A1 9/2022 Zhang et al.
2022/0294194 A1 9/2022 Cao et al.
2022/0298906 A1 9/2022 Zhong et al.
2022/0307359 A1 9/2022 Liu et al.
2022/0307424 A1 9/2022 Wang et al.
2022/0314248 A1 10/2022 Ge et al.
2022/0315347 A1 10/2022 Liu et al.
2022/0316306 A1 10/2022 Liu et al.
2022/0316362 A1 10/2022 Zhang et al.
2022/0316461 A1 10/2022 Wang et al.
2022/0325608 A1 10/2022 Zhang et al.
2022/0330411 A1 10/2022 Liu et al.
2022/0333471 A1 10/2022 Zhong et al.
2022/0339646 A1 10/2022 Yu et al.
2022/0341358 A1 10/2022 Ji et al.
2022/0341362 A1 10/2022 Feng et al.
2022/0341415 A1 10/2022 Deng et al.
2022/0345007 A1 10/2022 Liu et al.
2022/0349345 A1 11/2022 Zhang et al.
2022/0353980 A1 11/2022 Liu et al.
2022/0361309 A1 11/2022 Liu et al.
2022/0364452 A1 11/2022 Wang et al.
2022/0364453 A1 11/2022 Chang et al.
2022/0372865 A1 11/2022 Lin et al.
2022/0376280 A1 11/2022 Shao et al.
2022/0381126 A1 12/2022 Cui et al.
2022/0389799 A1 12/2022 Mao et al.
2022/0389803 A1 12/2022 Zhang et al.
2022/0389804 A1 12/2022 Cui et al.
2022/0389865 A1 12/2022 Feng et al.
2022/0389867 A1 12/2022 Li et al.
2022/0412196 A1 12/2022 Cui et al.
2022/0412199 A1 12/2022 Mao et al.
2022/0412200 A1 12/2022 Zhang et al.
2022/0412258 A1 12/2022 Li et al.
2022/0412379 A1 12/2022 Wang et al.
2023/0001524 A1 1/2023 Jiang et al.
2023/0003238 A1 1/2023 Du et al.
2023/0015132 A1 1/2023 Feng et al.
2023/0015529 A1 1/2023 Zhang et al.
2023/0015581 A1 1/2023 Ji et al.
2023/0017968 A1 1/2023 Deng et al.
2023/0029574 A1 2/2023 Zhang et al.
2023/0029671 A1 2/2023 Han et al.
2023/0036118 A1 2/2023 Xing et al.
2023/0040970 A1 2/2023 Liu et al.
2023/0042379 A1 2/2023 Zhang et al.
2023/0047033 A1 2/2023 Fu et al.
2023/0048551 A1 2/2023 Feng et al.
2023/0049462 A1 2/2023 Zhang et al.
2023/0064964 A1 3/2023 Wang et al.
2023/0074794 A1 3/2023 Liu et al.
2023/0085124 A1 3/2023 Zhong et al.
2023/0092506 A1 3/2023 Zhong et al.
2023/0092705 A1 3/2023 Liu et al.
2023/0106683 A1 4/2023 Zhang et al.
2023/0107300 A1 4/2023 Huang et al.
2023/0107791 A1 4/2023 Zhang et al.
2023/0109018 A1 4/2023 Du et al.
2023/0116458 A1 4/2023 Liu et al.
2023/0117362 A1 4/2023 Zhang et al.
2023/0119725 A1 4/2023 Wang et al.
2023/0119876 A1 4/2023 Mao et al.
2023/0119896 A1 4/2023 Zhang et al.
2023/0120810 A1 4/2023 Fu et al.
2023/0121251 A1 4/2023 Cui et al.

(56) References Cited

U.S. PATENT DOCUMENTS

| | | | |
|---|---|---|---|
| 2023/0124444 | A1 | 4/2023 | Chang et al. |
| 2023/0138582 | A1 | 5/2023 | Li et al. |
| 2023/0144116 | A1 | 5/2023 | Li et al. |
| 2023/0145963 | A1 | 5/2023 | Zhang et al. |
| 2023/0151722 | A1 | 5/2023 | Cui et al. |
| 2023/0151723 | A1 | 5/2023 | Ji et al. |
| 2023/0152793 | A1 | 5/2023 | Wang et al. |
| 2023/0160289 | A1 | 5/2023 | Cui et al. |
| 2023/0160510 | A1 | 5/2023 | Bao et al. |
| 2023/0163580 | A1 | 5/2023 | Ji et al. |
| 2023/0167776 | A1 | 6/2023 | Cui et al. |

FOREIGN PATENT DOCUMENTS

| | | | |
|---|---|---|---|
| CA | 2043184 | C | 8/1994 |
| CA | 2829762 | A1 | 9/2012 |
| CA | 2737321 | C | 9/2013 |
| CA | 2876687 | A1 | 5/2014 |
| CA | 2693567 | C | 9/2014 |
| CA | 2964597 | A1 | 10/2017 |
| CA | 3138533 | A1 | 11/2020 |
| CA | 2919175 | C | 3/2021 |
| CN | 2622404 | Y | 6/2004 |
| CN | 2779054 | Y | 5/2006 |
| CN | 2890325 | Y | 4/2007 |
| CN | 200964929 | Y | 10/2007 |
| CN | 101323151 | A | 12/2008 |
| CN | 201190660 | Y | 2/2009 |
| CN | 201190892 | Y | 2/2009 |
| CN | 201190893 | Y | 2/2009 |
| CN | 101414171 | A | 4/2009 |
| CN | 201215073 | Y | 4/2009 |
| CN | 201236650 | Y | 5/2009 |
| CN | 201275542 | Y | 7/2009 |
| CN | 201275801 | Y | 7/2009 |
| CN | 201333385 | Y | 10/2009 |
| CN | 201443300 | U | 4/2010 |
| CN | 201496415 | U | 6/2010 |
| CN | 201501365 | U | 6/2010 |
| CN | 201507271 | U | 6/2010 |
| CN | 201560210 | U | 8/2010 |
| CN | 201581862 | U | 9/2010 |
| CN | 201610728 | U | 10/2010 |
| CN | 201610751 | U | 10/2010 |
| CN | 201618530 | U | 11/2010 |
| CN | 201661255 | U | 12/2010 |
| CN | 101949382 | A | 1/2011 |
| CN | 201756927 | U | 3/2011 |
| CN | 102128011 | A | 7/2011 |
| CN | 102140898 | A | 8/2011 |
| CN | 102155172 | A | 8/2011 |
| CN | 102182904 | A | 9/2011 |
| CN | 202000930 | U | 10/2011 |
| CN | 202055781 | U | 11/2011 |
| CN | 202082265 | U | 12/2011 |
| CN | 202100216 | U | 1/2012 |
| CN | 202100217 | U | 1/2012 |
| CN | 202100815 | U | 1/2012 |
| CN | 202124340 | U | 1/2012 |
| CN | 202140051 | U | 2/2012 |
| CN | 202140080 | U | 2/2012 |
| CN | 202144789 | U | 2/2012 |
| CN | 202144943 | U | 2/2012 |
| CN | 202149354 | U | 2/2012 |
| CN | 102383748 | A | 3/2012 |
| CN | 202156297 | U | 3/2012 |
| CN | 202158355 | U | 3/2012 |
| CN | 202163504 | U | 3/2012 |
| CN | 202165236 | U | 3/2012 |
| CN | 202180866 | U | 4/2012 |
| CN | 202181875 | U | 4/2012 |
| CN | 202187744 | U | 4/2012 |
| CN | 202191854 | U | 4/2012 |
| CN | 202250008 | U | 5/2012 |
| CN | 101885307 | B | 7/2012 |
| CN | 102562020 | A | 7/2012 |
| CN | 202326156 | U | 7/2012 |
| CN | 202370773 | U | 8/2012 |
| CN | 202417397 | U | 9/2012 |
| CN | 202417461 | U | 9/2012 |
| CN | 102729335 | A | 10/2012 |
| CN | 202463955 | U | 10/2012 |
| CN | 202463957 | U | 10/2012 |
| CN | 202467739 | U | 10/2012 |
| CN | 202467801 | U | 10/2012 |
| CN | 202531016 | U | 11/2012 |
| CN | 202544794 | U | 11/2012 |
| CN | 102825039 | A | 12/2012 |
| CN | 202578592 | U | 12/2012 |
| CN | 202579164 | U | 12/2012 |
| CN | 202594808 | U | 12/2012 |
| CN | 202594928 | U | 12/2012 |
| CN | 202596615 | U | 12/2012 |
| CN | 202596616 | U | 12/2012 |
| CN | 102889191 | A | 1/2013 |
| CN | 202641535 | U | 1/2013 |
| CN | 202645475 | U | 1/2013 |
| CN | 202666716 | U | 1/2013 |
| CN | 202669645 | U | 1/2013 |
| CN | 202669944 | U | 1/2013 |
| CN | 202671336 | U | 1/2013 |
| CN | 202673269 | U | 1/2013 |
| CN | 202751982 | U | 2/2013 |
| CN | 102963629 | A | 3/2013 |
| CN | 202767964 | U | 3/2013 |
| CN | 202789791 | U | 3/2013 |
| CN | 202789792 | U | 3/2013 |
| CN | 202810717 | U | 3/2013 |
| CN | 202827276 | U | 3/2013 |
| CN | 202833093 | U | 3/2013 |
| CN | 202833370 | U | 3/2013 |
| CN | 202895467 | U | 4/2013 |
| CN | 202926404 | U | 5/2013 |
| CN | 202935216 | U | 5/2013 |
| CN | 202935798 | U | 5/2013 |
| CN | 202935816 | U | 5/2013 |
| CN | 202970631 | U | 6/2013 |
| CN | 103223315 | A | 7/2013 |
| CN | 203050598 | U | 7/2013 |
| CN | 103233714 | A | 8/2013 |
| CN | 103233715 | A | 8/2013 |
| CN | 103245523 | A | 8/2013 |
| CN | 103247220 | A | 8/2013 |
| CN | 103253839 | A | 8/2013 |
| CN | 103277290 | A | 9/2013 |
| CN | 103321782 | A | 9/2013 |
| CN | 203170270 | U | 9/2013 |
| CN | 203172509 | U | 9/2013 |
| CN | 203175778 | U | 9/2013 |
| CN | 203175787 | U | 9/2013 |
| CN | 102849880 | B | 10/2013 |
| CN | 203241231 | U | 10/2013 |
| CN | 203244941 | U | 10/2013 |
| CN | 203244942 | U | 10/2013 |
| CN | 203303798 | U | 11/2013 |
| CN | 103420532 | A | 12/2013 |
| CN | 203321792 | U | 12/2013 |
| CN | 203412658 | U | 1/2014 |
| CN | 203420697 | U | 2/2014 |
| CN | 203480755 | U | 3/2014 |
| CN | 103711437 | A | 4/2014 |
| CN | 203531815 | U | 4/2014 |
| CN | 203531871 | U | 4/2014 |
| CN | 203531883 | U | 4/2014 |
| CN | 203556164 | U | 4/2014 |
| CN | 203558809 | U | 4/2014 |
| CN | 203559861 | U | 4/2014 |
| CN | 203559893 | U | 4/2014 |
| CN | 203560189 | U | 4/2014 |
| CN | 102704870 | B | 5/2014 |
| CN | 203611843 | U | 5/2014 |
| CN | 203612531 | U | 5/2014 |
| CN | 203612843 | U | 5/2014 |
| CN | 203614062 | U | 5/2014 |

(56) References Cited

FOREIGN PATENT DOCUMENTS

| | | | |
|---|---|---|---|
| CN | 203614388 | U | 5/2014 |
| CN | 203621045 | U | 6/2014 |
| CN | 203621046 | U | 6/2014 |
| CN | 203621051 | U | 6/2014 |
| CN | 203640993 | U | 6/2014 |
| CN | 203655221 | U | 6/2014 |
| CN | 103899280 | A | 7/2014 |
| CN | 103923670 | A | 7/2014 |
| CN | 203685052 | U | 7/2014 |
| CN | 203716936 | U | 7/2014 |
| CN | 103990410 | A | 8/2014 |
| CN | 103993869 | A | 8/2014 |
| CN | 203754009 | U | 8/2014 |
| CN | 203754025 | U | 8/2014 |
| CN | 203754341 | U | 8/2014 |
| CN | 203756614 | U | 8/2014 |
| CN | 203770264 | U | 8/2014 |
| CN | 203784519 | U | 8/2014 |
| CN | 203784520 | U | 8/2014 |
| CN | 104057864 | A | 9/2014 |
| CN | 203819819 | U | 9/2014 |
| CN | 203823431 | U | 9/2014 |
| CN | 203835337 | U | 9/2014 |
| CN | 104074500 | A | 10/2014 |
| CN | 203876633 | U | 10/2014 |
| CN | 203876636 | U | 10/2014 |
| CN | 203877364 | U | 10/2014 |
| CN | 203877365 | U | 10/2014 |
| CN | 203877375 | U | 10/2014 |
| CN | 203877424 | U | 10/2014 |
| CN | 203879476 | U | 10/2014 |
| CN | 203879479 | U | 10/2014 |
| CN | 203890292 | U | 10/2014 |
| CN | 203899476 | U | 10/2014 |
| CN | 203906206 | U | 10/2014 |
| CN | 104150728 | A | 11/2014 |
| CN | 104176522 | A | 12/2014 |
| CN | 104196464 | A | 12/2014 |
| CN | 104234651 | A | 12/2014 |
| CN | 203971841 | U | 12/2014 |
| CN | 203975450 | U | 12/2014 |
| CN | 204020788 | U | 12/2014 |
| CN | 204021980 | U | 12/2014 |
| CN | 204024625 | U | 12/2014 |
| CN | 204051401 | U | 12/2014 |
| CN | 204060661 | U | 12/2014 |
| CN | 104260672 | A | 1/2015 |
| CN | 104314512 | A | 1/2015 |
| CN | 204077478 | U | 1/2015 |
| CN | 204077526 | U | 1/2015 |
| CN | 204078307 | U | 1/2015 |
| CN | 204083051 | U | 1/2015 |
| CN | 204113168 | U | 1/2015 |
| CN | 104340682 | A | 2/2015 |
| CN | 104358536 | A | 2/2015 |
| CN | 104369687 | A | 2/2015 |
| CN | 104402178 | A | 3/2015 |
| CN | 104402185 | A | 3/2015 |
| CN | 104402186 | A | 3/2015 |
| CN | 204209819 | U | 3/2015 |
| CN | 204224560 | U | 3/2015 |
| CN | 204225813 | U | 3/2015 |
| CN | 204225839 | U | 3/2015 |
| CN | 104533392 | A | 4/2015 |
| CN | 104563938 | A | 4/2015 |
| CN | 104563994 | A | 4/2015 |
| CN | 104563995 | A | 4/2015 |
| CN | 104563998 | A | 4/2015 |
| CN | 104564033 | A | 4/2015 |
| CN | 204257122 | U | 4/2015 |
| CN | 204283610 | U | 4/2015 |
| CN | 204283782 | U | 4/2015 |
| CN | 204297682 | U | 4/2015 |
| CN | 204299810 | U | 4/2015 |
| CN | 104594857 | A | 5/2015 |
| CN | 104595493 | A | 5/2015 |
| CN | 104612647 | A | 5/2015 |
| CN | 104612928 | A | 5/2015 |
| CN | 104632126 | A | 5/2015 |
| CN | 204325094 | U | 5/2015 |
| CN | 204325098 | U | 5/2015 |
| CN | 204326983 | U | 5/2015 |
| CN | 204326985 | U | 5/2015 |
| CN | 204344040 | U | 5/2015 |
| CN | 204344095 | U | 5/2015 |
| CN | 104727797 | A | 6/2015 |
| CN | 204402414 | U | 6/2015 |
| CN | 204402423 | U | 6/2015 |
| CN | 204402450 | U | 6/2015 |
| CN | 104803568 | A | 7/2015 |
| CN | 204436360 | U | 7/2015 |
| CN | 204457524 | U | 7/2015 |
| CN | 204472485 | U | 7/2015 |
| CN | 204473625 | U | 7/2015 |
| CN | 204477303 | U | 7/2015 |
| CN | 204493095 | U | 7/2015 |
| CN | 204493309 | U | 7/2015 |
| CN | 104820372 | A | 8/2015 |
| CN | 104832093 | A | 8/2015 |
| CN | 104863523 | A | 8/2015 |
| CN | 204552723 | U | 8/2015 |
| CN | 204553866 | U | 8/2015 |
| CN | 204571831 | U | 8/2015 |
| CN | 204703814 | U | 10/2015 |
| CN | 204703833 | U | 10/2015 |
| CN | 204703834 | U | 10/2015 |
| CN | 105092401 | A | 11/2015 |
| CN | 103790927 | B | 12/2015 |
| CN | 105207097 | A | 12/2015 |
| CN | 204831952 | U | 12/2015 |
| CN | 204899777 | U | 12/2015 |
| CN | 102602323 | B | 1/2016 |
| CN | 105240064 | A | 1/2016 |
| CN | 204944834 | U | 1/2016 |
| CN | 205042127 | U | 2/2016 |
| CN | 205172478 | U | 4/2016 |
| CN | 105536299 | A | 5/2016 |
| CN | 105545207 | A | 5/2016 |
| CN | 205260249 | U | 5/2016 |
| CN | 205297518 | U | 6/2016 |
| CN | 205298447 | U | 6/2016 |
| CN | 205391821 | U | 7/2016 |
| CN | 205400701 | U | 7/2016 |
| CN | 205477370 | U | 8/2016 |
| CN | 205479153 | U | 8/2016 |
| CN | 205503058 | U | 8/2016 |
| CN | 205503068 | U | 8/2016 |
| CN | 205503089 | U | 8/2016 |
| CN | 105958098 | A | 9/2016 |
| CN | 205599180 | U | 9/2016 |
| CN | 106121577 | A | 11/2016 |
| CN | 205709587 | U | 11/2016 |
| CN | 106246120 | A | 12/2016 |
| CN | 205805471 | U | 12/2016 |
| CN | 106321045 | A | 1/2017 |
| CN | 205858306 | U | 1/2017 |
| CN | 106438310 | A | 2/2017 |
| CN | 205937833 | U | 2/2017 |
| CN | 206129196 | U | 4/2017 |
| CN | 106715165 | A | 5/2017 |
| CN | 106761561 | A | 5/2017 |
| CN | 206237147 | U | 6/2017 |
| CN | 206287832 | U | 6/2017 |
| CN | 206346711 | U | 7/2017 |
| CN | 107120822 | A | 9/2017 |
| CN | 107143298 | A | 9/2017 |
| CN | 107159046 | A | 9/2017 |
| CN | 107188018 | A | 9/2017 |
| CN | 206496016 | U | 9/2017 |
| CN | 107234358 | A | 10/2017 |
| CN | 107261975 | A | 10/2017 |
| CN | 206581929 | U | 10/2017 |
| CN | 107476769 | A | 12/2017 |
| CN | 107520526 | A | 12/2017 |

(56) References Cited

FOREIGN PATENT DOCUMENTS

| | | | |
|---|---|---|---|
| CN | 206754664 | U | 12/2017 |
| CN | 107605427 | A | 1/2018 |
| CN | 107654196 | A | 2/2018 |
| CN | 107656499 | A | 2/2018 |
| CN | 107728657 | A | 2/2018 |
| CN | 206985503 | U | 2/2018 |
| CN | 207017968 | U | 2/2018 |
| CN | 107859053 | A | 3/2018 |
| CN | 207057867 | U | 3/2018 |
| CN | 207085817 | U | 3/2018 |
| CN | 107883091 | A | 4/2018 |
| CN | 107902427 | A | 4/2018 |
| CN | 107939290 | A | 4/2018 |
| CN | 107956708 | A | 4/2018 |
| CN | 207169595 | U | 4/2018 |
| CN | 207194873 | U | 4/2018 |
| CN | 207245674 | U | 4/2018 |
| CN | 108034466 | A | 5/2018 |
| CN | 108036071 | A | 5/2018 |
| CN | 108087050 | A | 5/2018 |
| CN | 207380566 | U | 5/2018 |
| CN | 108103483 | A | 6/2018 |
| CN | 108179046 | A | 6/2018 |
| CN | 108254276 | A | 7/2018 |
| CN | 108311535 | A | 7/2018 |
| CN | 207583576 | U | 7/2018 |
| CN | 207634064 | U | 7/2018 |
| CN | 207648054 | U | 7/2018 |
| CN | 207650621 | U | 7/2018 |
| CN | 108371894 | A | 8/2018 |
| CN | 207777153 | U | 8/2018 |
| CN | 108547601 | A | 9/2018 |
| CN | 108547766 | A | 9/2018 |
| CN | 108555826 | A | 9/2018 |
| CN | 108561098 | A | 9/2018 |
| CN | 108561750 | A | 9/2018 |
| CN | 108590617 | A | 9/2018 |
| CN | 207813495 | U | 9/2018 |
| CN | 207814698 | U | 9/2018 |
| CN | 207862275 | U | 9/2018 |
| CN | 108687954 | A | 10/2018 |
| CN | 207935270 | U | 10/2018 |
| CN | 207961582 | U | 10/2018 |
| CN | 207964530 | U | 10/2018 |
| CN | 108789848 | A | 11/2018 |
| CN | 108799473 | A | 11/2018 |
| CN | 108868675 | A | 11/2018 |
| CN | 208086829 | U | 11/2018 |
| CN | 208089263 | U | 11/2018 |
| CN | 208169068 | U | 11/2018 |
| CN | 108979569 | A | 12/2018 |
| CN | 109027662 | A | 12/2018 |
| CN | 109058092 | A | 12/2018 |
| CN | 208179454 | U | 12/2018 |
| CN | 208179502 | U | 12/2018 |
| CN | 208253147 | U | 12/2018 |
| CN | 208260574 | U | 12/2018 |
| CN | 109114418 | A | 1/2019 |
| CN | 109141990 | A | 1/2019 |
| CN | 208313120 | U | 1/2019 |
| CN | 208330319 | U | 1/2019 |
| CN | 208342730 | U | 1/2019 |
| CN | 208430982 | U | 1/2019 |
| CN | 208430986 | U | 1/2019 |
| CN | 109404274 | A | 3/2019 |
| CN | 109429610 | A | 3/2019 |
| CN | 109491318 | A | 3/2019 |
| CN | 109515177 | A | 3/2019 |
| CN | 109526523 | A | 3/2019 |
| CN | 109534737 | A | 3/2019 |
| CN | 208564504 | U | 3/2019 |
| CN | 208564516 | U | 3/2019 |
| CN | 208564525 | U | 3/2019 |
| CN | 208564918 | U | 3/2019 |
| CN | 208576026 | U | 3/2019 |
| CN | 208576042 | U | 3/2019 |
| CN | 208650818 | U | 3/2019 |
| CN | 208669244 | U | 3/2019 |
| CN | 109555484 | A | 4/2019 |
| CN | 109682881 | A | 4/2019 |
| CN | 208730959 | U | 4/2019 |
| CN | 208735264 | U | 4/2019 |
| CN | 208746733 | U | 4/2019 |
| CN | 208749529 | U | 4/2019 |
| CN | 208750405 | U | 4/2019 |
| CN | 208764658 | U | 4/2019 |
| CN | 109736740 | A | 5/2019 |
| CN | 109751007 | A | 5/2019 |
| CN | 208868428 | U | 5/2019 |
| CN | 208870761 | U | 5/2019 |
| CN | 109869294 | A | 6/2019 |
| CN | 109882144 | A | 6/2019 |
| CN | 109882372 | A | 6/2019 |
| CN | 209012047 | U | 6/2019 |
| CN | 209100025 | U | 7/2019 |
| CN | 110080707 | A | 8/2019 |
| CN | 110118127 | A | 8/2019 |
| CN | 110124574 | A | 8/2019 |
| CN | 110145277 | A | 8/2019 |
| CN | 110145399 | A | 8/2019 |
| CN | 110152552 | A | 8/2019 |
| CN | 110155193 | A | 8/2019 |
| CN | 110159225 | A | 8/2019 |
| CN | 110159432 | A | 8/2019 |
| CN | 110159433 | A | 8/2019 |
| CN | 110208100 | A | 9/2019 |
| CN | 110252191 | A | 9/2019 |
| CN | 110284854 | A | 9/2019 |
| CN | 110284972 | A | 9/2019 |
| CN | 209387358 | U | 9/2019 |
| CN | 110374745 | A | 10/2019 |
| CN | 209534736 | U | 10/2019 |
| CN | 110425105 | A | 11/2019 |
| CN | 110439779 | A | 11/2019 |
| CN | 110454285 | A | 11/2019 |
| CN | 110454352 | A | 11/2019 |
| CN | 110467298 | A | 11/2019 |
| CN | 110469312 | A | 11/2019 |
| CN | 110469314 | A | 11/2019 |
| CN | 110469405 | A | 11/2019 |
| CN | 110469654 | A | 11/2019 |
| CN | 110485982 | A | 11/2019 |
| CN | 110485983 | A | 11/2019 |
| CN | 110485984 | A | 11/2019 |
| CN | 110486249 | A | 11/2019 |
| CN | 110500255 | A | 11/2019 |
| CN | 110510771 | A | 11/2019 |
| CN | 110513097 | A | 11/2019 |
| CN | 209650738 | U | 11/2019 |
| CN | 209653968 | U | 11/2019 |
| CN | 209654004 | U | 11/2019 |
| CN | 209654022 | U | 11/2019 |
| CN | 209654128 | U | 11/2019 |
| CN | 209656622 | U | 11/2019 |
| CN | 107849130 | B | 12/2019 |
| CN | 110566173 | A | 12/2019 |
| CN | 110608030 | A | 12/2019 |
| CN | 110617187 | A | 12/2019 |
| CN | 110617188 | A | 12/2019 |
| CN | 110617318 | A | 12/2019 |
| CN | 209740823 | U | 12/2019 |
| CN | 209780827 | U | 12/2019 |
| CN | 209798631 | U | 12/2019 |
| CN | 209799942 | U | 12/2019 |
| CN | 209800178 | U | 12/2019 |
| CN | 209855723 | U | 12/2019 |
| CN | 209855742 | U | 12/2019 |
| CN | 209875063 | U | 12/2019 |
| CN | 110656919 | A | 1/2020 |
| CN | 110787667 | A | 2/2020 |
| CN | 110821464 | A | 2/2020 |
| CN | 110833665 | A | 2/2020 |
| CN | 110848028 | A | 2/2020 |
| CN | 210049880 | U | 2/2020 |

(56) References Cited

FOREIGN PATENT DOCUMENTS

| | | | |
|---|---|---|---|
| CN | 210049882 | U | 2/2020 |
| CN | 210097596 | U | 2/2020 |
| CN | 210105817 | U | 2/2020 |
| CN | 210105818 | U | 2/2020 |
| CN | 210105993 | U | 2/2020 |
| CN | 110873093 | A | 3/2020 |
| CN | 210139911 | U | 3/2020 |
| CN | 110947681 | A | 4/2020 |
| CN | 111058810 | A | 4/2020 |
| CN | 111075391 | A | 4/2020 |
| CN | 210289931 | U | 4/2020 |
| CN | 210289932 | U | 4/2020 |
| CN | 210289933 | U | 4/2020 |
| CN | 210303516 | U | 4/2020 |
| CN | 111089003 | A | 5/2020 |
| CN | 111151186 | A | 5/2020 |
| CN | 111167769 | A | 5/2020 |
| CN | 111169833 | A | 5/2020 |
| CN | 111173476 | A | 5/2020 |
| CN | 111185460 | A | 5/2020 |
| CN | 111185461 | A | 5/2020 |
| CN | 111188763 | A | 5/2020 |
| CN | 111206901 | A | 5/2020 |
| CN | 111206992 | A | 5/2020 |
| CN | 111206994 | A | 5/2020 |
| CN | 210449044 | U | 5/2020 |
| CN | 210460875 | U | 5/2020 |
| CN | 210522432 | U | 5/2020 |
| CN | 210598943 | U | 5/2020 |
| CN | 210598945 | U | 5/2020 |
| CN | 210598946 | U | 5/2020 |
| CN | 210599194 | U | 5/2020 |
| CN | 210599303 | U | 5/2020 |
| CN | 210600110 | U | 5/2020 |
| CN | 111219326 | A | 6/2020 |
| CN | 111350595 | A | 6/2020 |
| CN | 210660319 | U | 6/2020 |
| CN | 210714569 | U | 6/2020 |
| CN | 210769168 | U | 6/2020 |
| CN | 210769169 | U | 6/2020 |
| CN | 210769170 | U | 6/2020 |
| CN | 210770133 | U | 6/2020 |
| CN | 210825844 | U | 6/2020 |
| CN | 210888904 | U | 6/2020 |
| CN | 210888905 | U | 6/2020 |
| CN | 210889242 | U | 6/2020 |
| CN | 111397474 | A | 7/2020 |
| CN | 111412064 | A | 7/2020 |
| CN | 111441923 | A | 7/2020 |
| CN | 111441925 | A | 7/2020 |
| CN | 111503517 | A | 8/2020 |
| CN | 111515898 | A | 8/2020 |
| CN | 111594059 | A | 8/2020 |
| CN | 111594062 | A | 8/2020 |
| CN | 111594144 | A | 8/2020 |
| CN | 211201919 | U | 8/2020 |
| CN | 211201920 | U | 8/2020 |
| CN | 211202218 | U | 8/2020 |
| CN | 111608965 | A | 9/2020 |
| CN | 111664087 | A | 9/2020 |
| CN | 111677476 | A | 9/2020 |
| CN | 111677647 | A | 9/2020 |
| CN | 111692064 | A | 9/2020 |
| CN | 111692065 | A | 9/2020 |
| CN | 211384571 | U | 9/2020 |
| CN | 211397553 | U | 9/2020 |
| CN | 211397677 | U | 9/2020 |
| CN | 211412945 | U | 9/2020 |
| CN | 211500955 | U | 9/2020 |
| CN | 211524765 | U | 9/2020 |
| DE | 4004854 | A1 | 8/1991 |
| DE | 4241614 | A1 | 6/1994 |
| DE | 102009022859 | A1 | 12/2010 |
| DE | 102012018825 | A1 | 3/2014 |
| DE | 102013111655 | A1 | 12/2014 |
| DE | 102015103872 | A1 | 10/2015 |
| DE | 102013114335 | B4 | 12/2020 |
| EP | 0835983 | A2 | 4/1998 |
| EP | 1378683 | A3 | 8/2004 |
| EP | 2143916 | A1 | 1/2010 |
| EP | 2613023 | A2 | 7/2013 |
| EP | 3095989 | A1 | 11/2016 |
| EP | 3211766 | A1 | 8/2017 |
| EP | 3049642 | B1 | 4/2018 |
| EP | 3354866 | A1 | 8/2018 |
| EP | 3075946 | B1 | 5/2019 |
| FR | 2795774 | A1 | 1/2001 |
| GB | 474072 | A | 10/1937 |
| GB | 1438172 | A | 6/1976 |
| JP | S57135212 | A | 8/1982 |
| KR | 20020026398 | A | 4/2002 |
| RU | 13562 | U1 | 4/2000 |
| WO | 9320328 | A1 | 10/1993 |
| WO | 2006025886 | A2 | 3/2006 |
| WO | 2009023042 | A1 | 2/2009 |
| WO | 2011119668 | A1 | 9/2011 |
| WO | 2011133821 | A3 | 12/2011 |
| WO | 2012139380 | A1 | 10/2012 |
| WO | 2013158822 | A1 | 10/2013 |
| WO | WO-2013163786 | A1 | 11/2013 |
| WO | 2013185399 | A1 | 12/2013 |
| WO | 2015073005 | A1 | 5/2015 |
| WO | 2015158020 | A1 | 10/2015 |
| WO | 2016014476 | A1 | 1/2016 |
| WO | 2016033983 | A1 | 3/2016 |
| WO | 2016078181 | A1 | 5/2016 |
| WO | 2016086138 | A1 | 6/2016 |
| WO | 2016101374 | A1 | 6/2016 |
| WO | 2016112590 | A1 | 7/2016 |
| WO | 2016186790 | A1 | 11/2016 |
| WO | 2017146279 | A1 | 8/2017 |
| WO | 2017123656 | A3 | 10/2017 |
| WO | 2017213848 | A1 | 12/2017 |
| WO | 2018031031 | A1 | 2/2018 |
| WO | 2018031029 | A8 | 3/2018 |
| WO | 2018038710 | A1 | 3/2018 |
| WO | 2018044293 | A1 | 3/2018 |
| WO | 2018044307 | A1 | 3/2018 |
| WO | 2018071738 | A1 | 4/2018 |
| WO | 2018075034 | A8 | 5/2018 |
| WO | 2018084871 | A1 | 5/2018 |
| WO | 2018101912 | A1 | 6/2018 |
| WO | 2018106210 | A1 | 6/2018 |
| WO | 2018106225 | A1 | 6/2018 |
| WO | 2018106252 | A1 | 6/2018 |
| WO | 2018125176 | A1 | 7/2018 |
| WO | 2018132106 | A1 | 7/2018 |
| WO | 2018101909 | A8 | 8/2018 |
| WO | 2018152051 | A1 | 8/2018 |
| WO | 2018156131 | A1 | 8/2018 |
| WO | 2018160171 | A1 | 9/2018 |
| WO | 2018187346 | A1 | 10/2018 |
| WO | 2019045691 | A1 | 3/2019 |
| WO | 2019046680 | A1 | 3/2019 |
| WO | 2019060922 | A1 | 3/2019 |
| WO | 2019117862 | A1 | 6/2019 |
| WO | 2019126742 | A1 | 6/2019 |
| WO | 2019147601 | A1 | 8/2019 |
| WO | 2019169366 | A1 | 9/2019 |
| WO | 2019195651 | A1 | 10/2019 |
| WO | 2019200510 | A1 | 10/2019 |
| WO | 2019210417 | A1 | 11/2019 |
| WO | 2020018068 | A1 | 1/2020 |
| WO | 2020046866 | A1 | 3/2020 |
| WO | 2020076569 | A1 | 4/2020 |
| WO | 2020097060 | A2 | 5/2020 |
| WO | 2020104088 | A1 | 5/2020 |
| WO | 2020072076 | A8 | 6/2020 |
| WO | 2020131085 | A1 | 6/2020 |
| WO | 2020211083 | A1 | 10/2020 |
| WO | 2020211086 | A1 | 10/2020 |

(56) References Cited

FOREIGN PATENT DOCUMENTS

WO 2021038604 A1 3/2021
WO 2021041783 A1 3/2021

OTHER PUBLICATIONS

Halliburton, Vessel-based Modular Solution (VMS), 2015.
HCI Jet Frac, Screenshots from YouTube, Dec. 11, 2010. https://www.youtube.com/watch?v=6HjXkdbFaFQ.
Hydraulic Fracturing: Gas turbine proves successful in shale gasfield operations, Vericor (2017), https://www.vericor.com/wp-content/uploads/2020/02/7.-Fracing-4500hp-Pump-China-En.pdf ("Vericor Case Study").
Ibragimov, ?.S., Use of gas turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).
IHS Markit Standards Store, https://global.ihs.com/doc_ detail.cfm?document_name=API%20STD%20674&item_s_key=00010672#doc-detail-history-anchor, accessed Dec. 30, 2021; and https://global.ihs.com/doc_detail.cfm?&input_doc _number=671&input_doc_title=&document_name=API%20STD%20671&item_s_key=00010669&item_key_date=890331&origin=DSSC, accessed Dec. 30, 2021.
II-VI Marlow Industries, Thermoelectric Technologies in Oil, Gas, and Mining Industries, blog.marlow.com (Jul. 24, 2019).
Integrated Flow, Skid-mounted Modular Process Systems, Jul. 15, 2017, https://ifsolutions.com/why-modular/.
ISM, What is Cracking Pressure, 2019.
J. Porteiro et al., Feasibility of a new domestic CHP trigeneration with heat pump: II. Availability analysis. Design and development, Applied Thermal Engineering 24 (2004) 1421-1429.
JBG Enterprises, Inc., WS-Series Blowout Prevention Safety Coupling—Quick Release Couplings, Sep. 11, 2015, http://www.jgbhose.com/products/WS-Series-Blowout-Prevention-Safety-Coupling.asp.
Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www. prnewswire.com/news-releases/jereh-apollo-4500-turbine-frac-pumper-finishes-successful-field-operation-in-china-300035829.html.
Jereh Apollo Turbine Fracturing Pumper Featured on China Central Television, Jereh Group (Mar. 9, 2018), https://www.jereh.com/en/news/press-release/news-detail-7267.htm.
Jereh Debut's Super power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.
Jereh Group, Jereh Fracturing Equipment. YouTube (Jun. 8, 2015), https://www.youtube.com/watch?v=m0vMiq84P4Q.
Jereh Group, Jereh Fracturing Unit, Fracturing Spread, YouTube (Mar. 30, 2015), https://www.youtube.com/watch?v=PlkDbU5dE0o.
Jereh Unveiled New Electric Fracturing Solution at OTC 2019, Jereh Group (May 7, 2019), as available on May 28, 2019, https://web.archive.org/web/20190528183906/https://www.prnewswire .com/news-releases/jereh-unveiled-new-electric-fracturing-solution-at-otc-2019-300845028.html.
Jp Yadav et al., Power Enhancement of Gas Turbine Plant by Intake Air Fog Cooling, Jun. 2015.
Karassik, Igor, Joseph Messina, Paul Cooper, and Charles Heald. Pump Handbook. 4th ed. New York: McGraw-Hill Education, 2008.
Karen Boman, Turbine Technology Powers Green Field Multi-Fuel Frack Pump, Rigzone (Mar. 7, 2015), as available on Mar. 14, 2015, https://web.archive.org/web/20150314203227/https://www.rigzone.com/news/oil-gas/a/124883/Turbine_Technology_Powers_Green_Field_MultiFuel_Frack_Pump.
Kas'yanov et al., Application of gas-turbine engines in pumping units complexes of hydraulic fracturing of oil and gas reservoirs; Exposition Oil & Gas; (Oct. 2012) (published in Russian).
Lekontsev, Yu M., et al. "Two-side sealer operation." Journal of Mining Science 49.5 (2013): 757-762.
Leslie Turj, Green Field asset sale called 'largest disposition industry has seen,' The INDsider Media (Mar. 19, 2014), http://theind.com/ article-16497-green-field-asset-sale-called-%E2%80%98largest-disposition-industry-has-seen%60.html.
M. Ahmadzadehtalatapeh et al. Performance enhancement of gas turbine units by retrofitting with inlet air cooling technologies (IACTs): an hour-by-hour simulation study, Journal of the Brazilian Society of Mechanical Sciences and Engineering, Mar. 2020.
Marine Turbine Technologies, 1 MW Power Generation Package, http://marineturbine.com/power-generation, 2017.
Marine Turbine. Turbine Powered Frac Units. Franklin, Louisiana: Marine Turbine Technologies, 2020.
Mee Industries: Inlet Air Fogging Systems for Oil, Gas and Petrochemical Processing, Verdict Media Limited Copyright 2020.
Mobile Fuel Delivery, atlasoil.com. Mar. 6, 2019. https://www.atlasoil.com/nationwide-fueling/onsite-and-mobile-fueling.
Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).
Overview of Industry Guidance/Best Practices on Hydraulic Fracturing (HF), American Petroleum Institute, © 2012.
PbNG, Natural Gas Fuel for Drilling and Hydraulic Fracturing, Diesel Displacement / Dual Fuel & Bi-Fuel, May 2014.
Pettigrew, Dana, et al., High Pressure Multi-Stage Centrifugal Pump for 10,000 psi Frac Pump—HPHPS Frac Pump, Copyright 2013, Society of Petroleum Engineers, SPE 166191.
Plos One, Dynamic Behavior of Reciprocating Plunger Pump Discharge Valve Based on Fluid Structure Interaction and Experimental Analysis. Oct. 21, 2015.
Porter, John A. (Solar Division International Harvester Co.), Modern Industrial Gas Turbines for the Oil Field; American Petroleum Institute; Drilling and Production Practice; API-67-243 (Jan. 1, 1967).
PowerShelter Kit II, nooutage.com, Sep. 6, 2019.
Procedures for Standards Development, American Petroleum Institute, Third Edition (2006).
Publications, American Petroleum Institute, WaybackMachine Capture, https://web.archive.org/web/20110427043936 / http://www.api.org:80/Publications/, captured Apr. 27, 2011.
Pump Control With Variable Frequency Drives, Kevin Tory, Pumps & Systems: Advances in Motors and Drives, Reprint from Jun. 2008.
Researchgate, Answer by Byron Woolridge, found at https://www.researchgate.net/post/How_can_we_improve_the_efficiency_of_the_gas_turbine_cycles, Jan. 1, 2013.
Review of HHP Summit 2012, Gladstein, Neandross & Associates https://www.gladstein.org/gna-conferences/high-horsepower-summit-2012/.
Rigmaster Machinery Ltd., Model: 2000 RMP-6-PLEX, brochure, downloaded at https://www.rigmastermachinery.com/_files/ugd/431e62_eaecd77091e54af8b13d08396072da67.pdf.
Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.
Shandong Saigao Group Corporation. Q4 (5W115) Quintuplex Plunger Pump. Jinan City, Shandong Province, China; Saigao. Oct. 20, 2014. https://www.saigaogroup.com/product/q400-5w115-quintuplex-plunger-pump.html.
Special-Purpose Couplings for Petroleum, Chemical, and Gas Industry Services, API Standard 671 (4th Edition) (2010).
SPM® QEM 5000 E-Frac Pump Specification Sheet, Weir Group (2019) ("Weir 5000").
Standards, American Petroleum Institute, WaybackMachine Capture, https://web.archive.org/web/20110207195046/http:/www.api.org/Standards/, captured Feb. 7, 2011; and https://web.archive.org/web/20110204112554/http://global.ihs.com/?RID=API1, captured Feb. 4, 2011.
Swagelok, The right valve for controlling flow direction? Check, 2016.

(56) References Cited

OTHER PUBLICATIONS

Technology.org, Check valves how do they work and what are the main type, 2018.
The Application of Flexible Couplings for Turbomachinery, Jon R.Mancuso et al., Proceedings of the Eighteenthturbomachinery Symposium (1989).
The Leader in Frac Fueling, suncoastresources.com. Jun. 29, 2015. https://web.archive.org/web/20150629220609/https://www.suncoastresources.com/oilfield/fueling-services/.
The Weir Group, Inc. Weir SPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.
Tom Hausfeld, GE Power & Water, and Eldon Schelske, Evolution Well Services, TM2500+ Power for Hydraulic Fracturing.
Transcript of Jereh Group, Jereh Fracturing Equipment, YouTube (Jun. 8, 2015), https://www.youtube.com/watch?v=m0vMiq84P4Q.
Transcript of Jereh Group, Jereh Fracturing Unit, Fracturing Spread, YouTube (Mar. 30, 2015).
US 11,555,493, 1/2023, Chang et al. (withdrawn)
Wallace, E.M., Associated Shale Gas: From Flares to Rig Power, Copyright 2015, Society of Petroleum Engineers, SPE-173491-MS.
Walzel, Brian, Hart Energy, Oil, Gas Industry Discovers Innovative Solutions to Environmental Concerns, Dec. 10, 2018.
Weir Oil & Gas Introduces Industry's First Continuous Duty 5000-Horsepower Pump, Weir Group (Jul. 25, 2019), https://www.global. weir/newsroom/news-articles/weir-oil-and-gas-introduces-industrys-first-continuous-duty-5000-horsepower-pump/.
Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.
Wikipedia, Westinghouse Combustion Turbine Systems Division, https://en.wikipedia.org/wiki/Westinghouse_Combustion_Turbine_Systems_Division, circa 1960.
Wikipedia, Union Pacific GTELs, https://en.wikipedia.org/wiki/Union_Pacific_GTELs, circa 1950.
Williams, C.W. (Gulf Oil Corp. Odessa Texas), The Use of Gas-turbine Engines in an Automated High-Pressure Water-Injection Stations; American Petroleum Institute; API-63-144 (Jan. 1, 1963).
Wolf, J?rgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
WorldCat Library Collections Database Records for API Standard 671 and API Standard 674, https://www.worldcat.org/title/positive-displacement-pumps-reciprocating/oclc/ 858692269&referer=brief_results, accessed Dec. 30, 2021; and https://www.worldcat.org/title/special-purpose-couplings-for-petroleum-chemical-and-gas-industry-services/bclc/871254217&referer=brief_results, accessed Dec. 22, 2021.
ZSi-Foster, Energy | Solar | Fracking | Oil and Gas, Aug. 2020, https://www.zsi-foster.com/energy-solar-fracking-oil-and-gas.html.
"Turbine Frac Units," WMD Squared (2012), https://wmdsquared.com/work/gfes-turbine-frac-units/.
"Honghua developing new-generation shale-drilling rig, plans testing of frac pump"; Katherine Scott; Drilling Contractor; May 23, 2013; accessed at https://www.drillingcontractororg/honghua-developing-new-generation-shale-drilling-rig-plans-testing-of-frac-pump-23278.
2011 Publications and Services, American Petroleum Institute (2011).
2012 High Horsepower Summit Agenda, Natural Gas for High Horsepower Applications (Sep. 5, 2012).
35% Economy Increase, Dual-fuel System Highlighting Jereh Apollo Frac Pumper, Jereh Group (Apr. 13, 2015), https://www.jereh.com/en/news/press-release/news-detail-7345.htm.
About API, American Petroleum Institute, https://www.api.org /about, accessed Dec. 30, 2021.
About API, American Petroleum Institute, WaybackMachine Capture, https://web.archive.org/web/20110422104346 / http://api.org/aboutapi/, captured Apr. 22, 2011.
Advances in Popular Torque-Link Solution Offer OEMs Greater Benefit, Jun. 21, 2018.
AFD Petroleum Ltd., Automated Hot Zone, Frac Refueling System, Dec. 2018.
AFGlobal Corporation, Durastim Hydraulic Fracturing Pump, A Revolutionary Design for Continuous Duty Hydraulic Fracturing, 2018.
American Petroleum Institute. API 616: Gas Turbines for the Petroleum, Chemical, and Gas Industry Services. 5th ed. Washington, DC: API Publishing Services, 2011.
American Petroleum Institute. API 674: Positive Displacement Pumps—Reciprocating. 3rd ed. Washington, DC: API Publishing Services, 2010.
Ankit Tiwari, Design of a Cooling System for a Hydraulic Fracturing Equipment, The Pennsylvania State University, The Graduate School, College of Engineering, 2015.
API Member Companies, American Petroleum Institute, WaybackMachine Capture, https://web.archive.org/web/20130424080625/http://api.org/globalitems/globalheaderpages/membership/api-member-companies, accessed Jan. 4, 2021.
API's Global Industry Services, American Petroleum Institute, © Aug. 2020.
Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.
B.M. Mahlalela, et al., .Electric Power Generation Potential Based on Waste Heat and Geothermal Resources in South Africa, pangea. Stanford.edu (Feb. 11, 2019).
Blago Minovski, Coupled Simulations of Cooling and Engine Systems for Unsteady Analysis of the Benefits of Thermal Engine Encapsulation, Department of Applied Mechanics, Chalmers University of Technology G{umlaut over ( )} oteborg, Sweden 2015.
Business Week: Fiber-optic cables help fracking, cablinginstall.com. Jul. 12, 2013. https://www.cablinginstall.com/cable/article/16474208/businessweek-fiberoptic-cables-help-fracking.
Cameron, A Schlumberger Company, Frac Manifold Systems, 2016.
CanDyne Pump Services, Inc. Weatherford Q700 Pump. Calgary, Alberta, Canada: CanDyne Pump Services. Aug. 15, 2015. http://candyne.com/wp-content/uploads/2014/10//181905-94921.q700-quintuplex-pump.pdf.
Capstone Turbine Corporation, Capstone Receives Three Megawatt Order from Large Independent Oil & Gas Company in Eagle Ford Shale Play, Dec. 7, 2010.
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
CNG Delivery, Fracturing with natural gas, dual-fuel drilling with CNG, Aug. 22, 2019.
Cooper et al., Jet Frac Porta-Skid—A New Concept in Oil Field Service Pump Equipments[sic]; Halliburton Services; SPE-2706 (1969).
De Gevigney et al., "Analysis of No. load dependent power losses in a planetary gear train by using thermal network method", International Gear Conference 2014: Aug. 26-28, 2014, Lyon, pp. 615-624.
Department of Energy, United States of America, The Water-Energy Nexus: Challenges and Opportunities purenergypolicy.org (Jun. 2014).
Dowell B908 "Turbo-Jet" Operator's Manual.

(56) References Cited

OTHER PUBLICATIONS

Dziubak, Tadeusz, "Experimental Studies of Dust Suction Irregularity from Multi-Cyclone Dust Collector of Two-Stage Air Filter", Energies 2021, 14, 3577, 28 pages.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.
Emmanuel Akita et al., Mewbourne College of Earth & Energy, Society of Petroleum Engineers; Drilling Systems Automation Technical Section (DSATS); 2019.
EMPengineering.com, HEMP Resistant Electrical Generators / Hardened Structures HEMP/GMD Shielded Generators, Virginia, Nov. 3, 2012.
Europump and Hydrualic Institute, Variable Speed Pumping: A Guide to Successful Applications, Elsevier Ltd, 2004.
Eygun, Christiane, et al., URTeC: 2687987, Mitigating Shale Gas Developments Carbon Footprint: Evaluating and Implementing Solutions in Argentina, Copyright 2017, Unconventional Resources Technology Conference.
Ferdinand P. Beer et al., Mechanics of Materials (6th ed. 2012).
Filipovi?, Ivan, Preliminary Selection of Basic Parameters of Different Torsional Vibration Dampers Intended for use in Medium-Speed Diesel Engines, Transactions of Famena XXXVI-3 (2012).
Final written decision of PGR2021-00102 dated Feb. 6, 2023.
Final written decision of PGR2021-00103 dated Feb. 6, 2023.
FMC Technologies, Operation and Maintenance Manual, L06 Through L16 Triplex Pumps Doc No. OMM50000903 Rev: E p. 1 of 66. Aug. 27, 2009.
Frac Shack, Bi-Fuel FracFueller brochure, 2011.
Frac Tank Hose (FRAC), 4starhose.com. Accessed: Nov. 10, 2019. http://www.4starhose.com/product/frac_tank_hose_frac.aspx.
Fracking companies switch to electric motors to power pumps, iadd-intl.org. Jun. 27, 2019. https://www.iadd-intl.org/articles/fracking-companies-switch-to-electric-motors-to-power-pumps/.
Fracture Design and Stimulation, Mike Eberhard, P.E., Wellconstruction & Operations Technical Workshop Insupport of the EPA Hydraulic Fracturing Study, Mar. 10-11, 2011.
FTS International's Dual Fuel Hydraulic Fracturing Equipment Increases Operational Efficiencies, Provides Cost Benefits, Jan. 3, 2018.
Gardner Denver Hydraulic Fracturing Pumps GD 3000 https://www.gardnerdenver.com/en-us/pumps/triplex-fracking-pump-gd-3000.
General Purpose vs. Special Purpose Couplings, Jon Mancuso, Proceedings of the Twenty-Third Turbomachinerysymposium (1994).
Ginter, Timothy, and Thomas Bouvay. "Uprate options for the MS7001 heavy duty gas turbine." GE paper GER-3808C, GE Energy 12 (2006).
Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-spread-162113425.

* cited by examiner

METHODS FOR DETECTION AND MITIGATION OF WELL SCREEN OUT

PRIORITY CLAIM

This is a continuation of U.S. Non-Provisional application Ser. No. 17/991,007, filed Nov. 21, 2022, titled "METHODS FOR DETECTION AND MITIGATION OF WELL SCREEN OUT," now U.S. Pat. No. 11,939,854 issued Mar. 26, 2024, which is a continuation of U.S. Non-Provisional application Ser. No. 17/355,920, filed Jun. 23, 2021, titled "METHODS FOR DETECTION AND MITIGATION OF WELL SCREEN OUT," now U.S. Pat. No. 11,566,506 issued Jan. 31, 2023, which is continuation of U.S. Non-Provisional application Ser. No. 17/303,841, filed Jun. 9, 2021, titled "METHODS AND SYSTEMS FOR DETECTION AND MITIGATION OF WELL SCREEN OUT," now U.S. Pat. No. 11,208,881, issued Dec. 28, 2021, which is a continuation of U.S. Non-Provisional application Ser. No. 17/182,408, filed Feb. 23, 2021, titled "METHODS FOR DETECTION AND MITIGATION OF WELL SCREEN OUT," now U.S. Pat. No. 11,066,915, issued Jul. 20, 2021, which claims priority to and the benefit of U.S. Provisional Application No. 62/705,050, filed Jun. 9, 2020, titled "METHODS AND SYSTEMS FOR DETECTION AND MITIGATION OF WELL SCREEN OUT," the disclosures of which are incorporated herein by reference in their entireties.

TECHNICAL FIELD

The application generally relates to mobile power units and, more specifically, drive equipment and methods for usage, installation on, and controls for mobile fracturing transportation platforms.

BACKGROUND

Hydrocarbon exploration and energy industries employ various systems and operations to accomplish activities including drilling, formation evaluation, stimulation and production. Measurements such as temperature, pressure, and flow measurements are typically performed to monitor and assess such operations. During such operations, problems or situations may arise that may have a detrimental effect on the operation, equipment, and/or safety of operators. For example, during a stimulation or fracturing operation, screen out conditions may occur, which may cause rapid pressure increases that may compromise the operation and/or damage equipment.

SUMMARY

Embodiment of systems, methods, and controllers that control the operation to detect and mitigate screen outs such that screen outs are avoided, for example, may save time, may increase awareness of conditions within the well, and may increase safety at a wellsite hydraulic fracturing pumper system. For example, Applicant has recognized that a controller detecting and mitigating screen outs may avoid packing of a well and avoid the need for additional operations to stimulate a well, e.g., wire line operations. In addition, a controller that avoids rapid pressure increases associated with screen outs may reduce stress on fracturing equipment including power end assemblies, shocking of prime movers and gearing systems associated therewith, and piping of the well. Further, the methods and systems detailed herein may prevent energy release in the form of release pressure through a pressure relief valve, e.g., a wellhead or manifold pressure relief valve. Avoiding pressure release from a pressure valve may also increase the safety of the wellhead, for example, by not over pressuring a wellhead.

Applicant also has recognized that a controller that detects and mitigates screen outs may also increase awareness of conditions within the well by detecting a rate of pressure increase more accurately and at a more frequent rate than with manual control. In some embodiments, the controller may prewarn by one or more tiers of pressure increase rates such that an operator may manually adjust proppant concentration or take other measures to avoid screen outs before the controller intervenes as would be appreciated by those skilled in the art. The controller may also control the blender and the fracturing pump with a single command such that an operator is not required to sequence both elements in a safe manner to avoid damage to equipment, e.g., via cavitation, and to avoid screen out.

In accordance with an embodiment of the present disclosure, a method of detecting and mitigating well screen out at a fracturing well site during hydrocarbon production may include operating a fracturing pump to supply fluid at a discharge rate to a wellhead at a fracturing well site. The method also may include operating a blender positioned to deliver a blend of proppant and fluid to the fracturing pump. A fluid pressure of the fluid supplied to the wellhead may be measured and a fluid pressure increase rate of the fluid may be determined from the fluid pressure. The fluid pressure increase rate may be compared to a preselected increase rate indicative of a potential well screen out. When the fluid pressure increase rate exceeds the preselected increase rate and the fluid pressure is within a preselected percentage of a maximum wellhead pressure of the well head, the discharge rate of the fracturing pumps may be incrementally decreased until the fluid pressure increase rate is stabilized. Stabilizing the fluid pressure increase rate may include the fluid pressure increase rate being equal to or less than zero.

In accordance with another embodiment of the present disclosure, a wellsite hydraulic fracturing pumper system may include one or more fracturing pumps, a blender, a pressure transducer, and a controller. The one or more fracturing pumps may be configured to provide fluid to a wellhead when positioned a hydrocarbon well site. The blender may be configured to provide fluid and proppant to the one or more fracturing pumps. The pressure transducer may be positioned adjacent an output of the one or more fracturing pumps or at the wellhead. The pressure transducer may be configured to measure a fluid pressure of the fluid provided to the wellhead. The controller may control the one or more fracturing pumps and the blender. The controller may be positioned in signal communication with the pressure transducer such that the controller receives the fluid pressure of the fluid provided to the wellhead. The controller may include memory, a processor to process data, and a screen out detection and mitigation protocol program stored in the memory and responsive to the process and in which the protocol of the controller may incrementally decrease a discharge rate of the one or more fracturing pumps and a flow rate of the blender in response to a fluid pressure increase rate of the fluid suppled to the wellhead being greater than a preselected increase rate and the fluid pressure of the fluid provided to the wellhead being greater than a preselected percentage of a maximum wellhead pressure until the fluid pressure is stabilized.

In yet another embodiment of the present disclosure, a controller for a hydraulic fracturing pumper system may include a pressure input, a first control output, and a second control output. The pressure input may be in signal communication with a pressure transducer that measures a fluid pressure of a fluid being provided to a wellhead. The first control output may be in signal communication with a fracturing pump such that the controller provides pump control signals to the fracturing pump to control a discharge rate of the fracturing pump. The second control output may be in signal communication with a blender such that the controller provides blender control signals to the blender to control a flow rate of the blender and delivery of a proppant from the blender. The controller may be configured to calculate a fluid pressure increase rate of the fluid pressure, compare the fluid pressure increase rate of the fluid pressure to a preselected increase rate, and incrementally decrease a discharge rate of the fracturing pump and a flow rate of the blender when the fluid pressure increase rate is greater than the preselected increase rate and the fluid pressure is within a preselected percentage of a maximum wellhead pressure of the wellhead until the fluid pressure of the fluid is supplied to the wellhead is stabilized.

Those skilled in the art will appreciate the benefits of various additional embodiments reading the following detailed description of the embodiments with reference to the below-listed drawing figures. It is within the scope of the present disclosure that the above-discussed embodiments and aspects be provided both individually and in various combinations.

BRIEF DESCRIPTION OF THE DRAWINGS

The accompanying drawings, which are included to provide a further understanding of the embodiments of the present disclosure, are incorporated in and constitute a part of this specification, and together with the detailed description, serve to explain the principles of the embodiments discussed herein. The present disclosure may be more readily described with reference to the accompanying drawings.

Corresponding parts are designated by corresponding reference numbers throughout the drawings.

DETAILED DESCRIPTION

Figure 1:
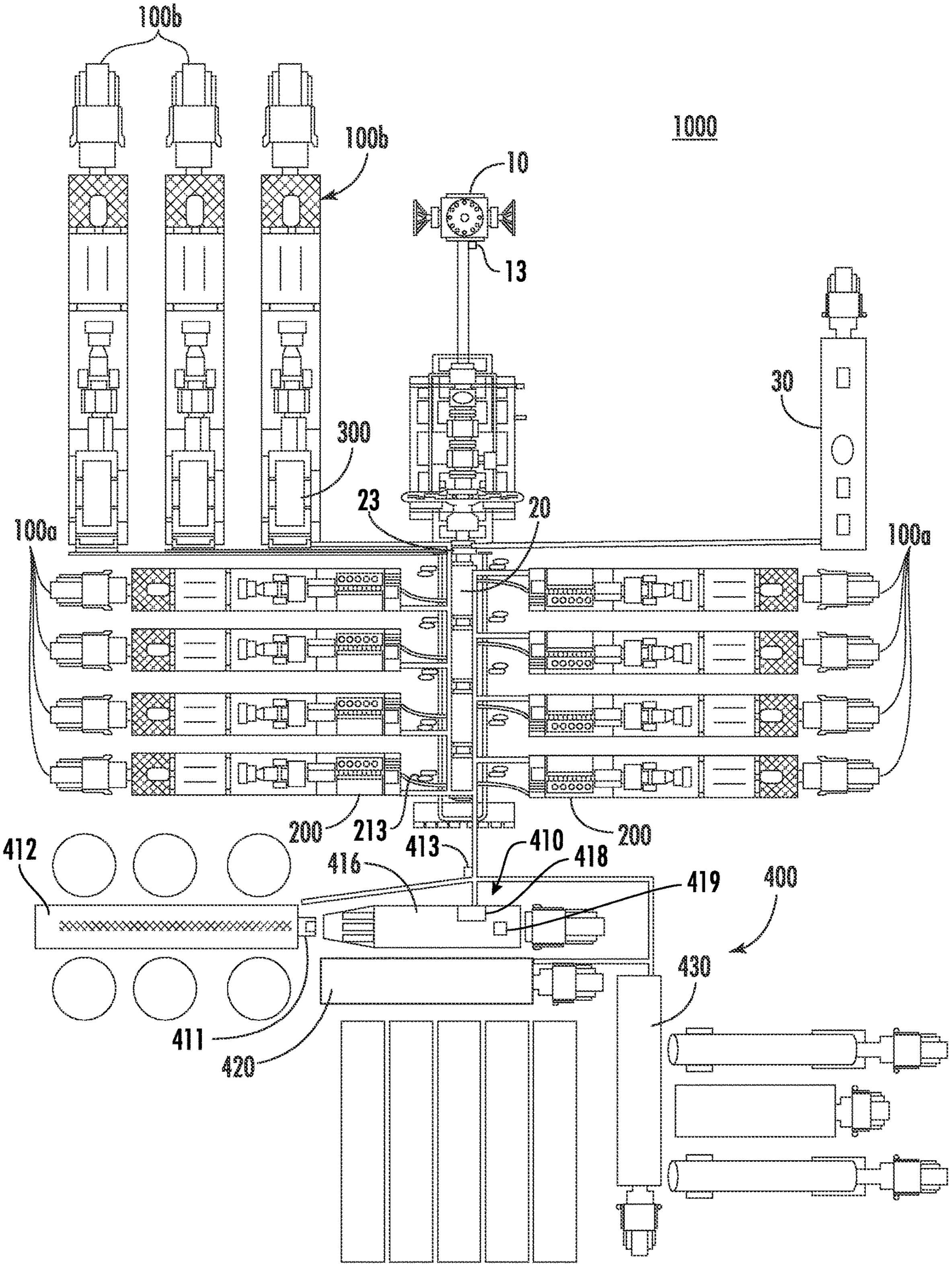
FIG. 1 is a schematic view of a wellsite hydraulic fracturing pumper system according to an embodiment of the disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect may be combined with features from any other embodiment or aspect in any appropriate combination. For example, any individual or collective features of method aspects or embodiments may be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms “a,” “an,” “the,” and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Embodiments of the present disclosure are directed to methods and systems for detecting and mitigating well screen outs during the operations of wellsite hydraulic fracturing pumping systems during the production of hydrocarbons. The methods and systems detailed herein may be executed on a controller that provides alerts or alarms to an operator of a potential well screen out and may intervene to prevent the fluid pressure provided to the well from exceeding a maximum well pressure.

FIG. 1 illustrates an exemplary wellsite hydraulic fracturing pumper system 1000 that is provided in accordance with an embodiment of the present disclosure. The wellsite hydraulic fracturing pumper system 1000 includes a plurality of mobile power units 100 arranged around a wellhead 10 to supply the wellhead 10 with high-pressure fracturing fluids and recover oil and/or gas from the wellhead 10 as will be understood by those skilled in the art. As shown, some of the mobile power units 100, e.g., mobile power units **100*a*, drive a hydraulic fracturing pump 200 that discharges high pressure fluid to a manifold 20 such that the high pressure fluid is provided to the wellhead 10. Additionally, some of the mobile power units 100, e.g., mobile power units 100*b*, drive an electrical generator 300 that provides electrical power to the wellsite hydraulic fracturing pumper system 1000**.

The wellsite hydraulic fracturing pumper system 1000 also includes a blender unit 410, a hydration unit 420, or a chemical additive unit 430 which may be referred to generally as backside equipment 400. Specifically, the blender unit 410 provides a flow of fluid to the fracturing pumps 200 which is pressurized by and discharged from the fracturing pumps 200 into the manifold 20. The blender unit 410 may include one or more screw conveyors 412 that provides proppant to a mixer 416 of the blender unit 410. The blender unit 410 also includes a discharge pump 418 that draws fluid from the mixer 416 such that a flow of fluid is provided from the blender unit 410 to the fracturing pumps 200. The fluid from the mixer 416 may include proppant provided by the screw conveyors 412 and/or chemicals for the fluid of the fracturing pumps 200. When blender unit 410 provides proppant to the fracturing pumps 200, the proppant is in a slurry which may be considered a fluid as will be understood by those skilled in the art.

The wellsite hydraulic fracturing pumper system 1000 includes a supervisory control unit that monitors and controls operation of the mobile power units **100*a* driving the fracturing pumps 200, the mobile power units 100*b* driving electrical generators 300, and the units 410, 420, 430 and may be referred to generally as controller 30. The controller 30 may be a mobile control unit in the form of a trailer or a van, as appreciated by those skilled in the art. As used herein, the term “fracturing pump” may be used to refer to one or more of the hydraulic fracturing pumps 200 of the hydraulic fracturing pumper system 1000. In some embodiments, all of the hydraulic fracturing pumps 200 are controlled by the controller 30 such that to an operator of the controller 30, the hydraulic fracturing pumps 200** are controlled as a single pump or pumping system.

The controller 30 is in signal communication with the blender unit 410 to control the delivery of the proppant to the mixer 416 and a flow rate of fluid from the discharge pump 418 to the fracturing pumps 200. The controller 30 is also in signal communication with the fracturing pumps 200 to control a discharge rate of fluid from the fracturing pumps 200 into the manifold 20. In addition, the controller 30 is in signal communication with one or more sensors of the wellsite hydraulic fracturing pumper system 1000 to receive measurements or data with respect to the fracturing operation. For example, the controller 30 receives a measurement of pressure of the fluid being delivered to the wellhead 10 from a wellhead pressure transducer 13, a manifold pressure transducer 23, or a pump output pressure transducer 213. The wellhead pressure transducer 13 is disposed at the wellhead 10 to measure a pressure of the fluid at the wellhead 10. The manifold pressure transducer 23 is shown at an end of the manifold 20. However, as understood by those skilled in the art, the pressure within the manifold 20 is substantially the same throughout the entire manifold 20 such that the manifold pressure transducer 23 may be disposed anywhere within the manifold 20 to provide a pressure of the fluid being delivered to the wellhead 10. The pump output pressure transducer 213 is disposed adjacent an output of one of the fracturing pumps 200 which is in fluid communication with the manifold 20 and thus, the fluid at the output of the fracturing pumps 200 is at substantially the same pressure as the fluid in the manifold 20 and the fluid being provided to the wellhead 10. Each of the fracturing pumps 200 may include a pump output pressure transducer 213 and the controller 30 may calculate the fluid pressure provided to the wellhead 10 as an average of the fluid pressure measured by each of the pump output pressure transducers 213.

The controller 30 is also in signal communication with sensors disposed about the blender unit 410. For example, the blender unit 410 may include a blender screw encoder/pickup 411 that provides a rotation rate of the screw conveyors 412 of the blender unit 410 which provide proppant to the mixer 416 such that proppant is provided to the fracturing pumps 200. When the screw conveyors 412 are not active or rotating, proppant is not being added to the mixer 416 such that no proppant is being provided to the fracturing pumps 200. The blender unit 410 may include a blender flow meter 413 that measures a flow of fluid from the blender unit 410 to the fracturing pumps 200.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another. For example, a pump output pressure transducer 213 may be in direct electrical communication with a pump controller (not explicitly shown) and the pump controller may be in direct electrical communication or wireless communication with a master controller (not explicitly shown) of the mobile power unit 100 which is in electrical or wireless communication with the controller 30.

Figure 2:
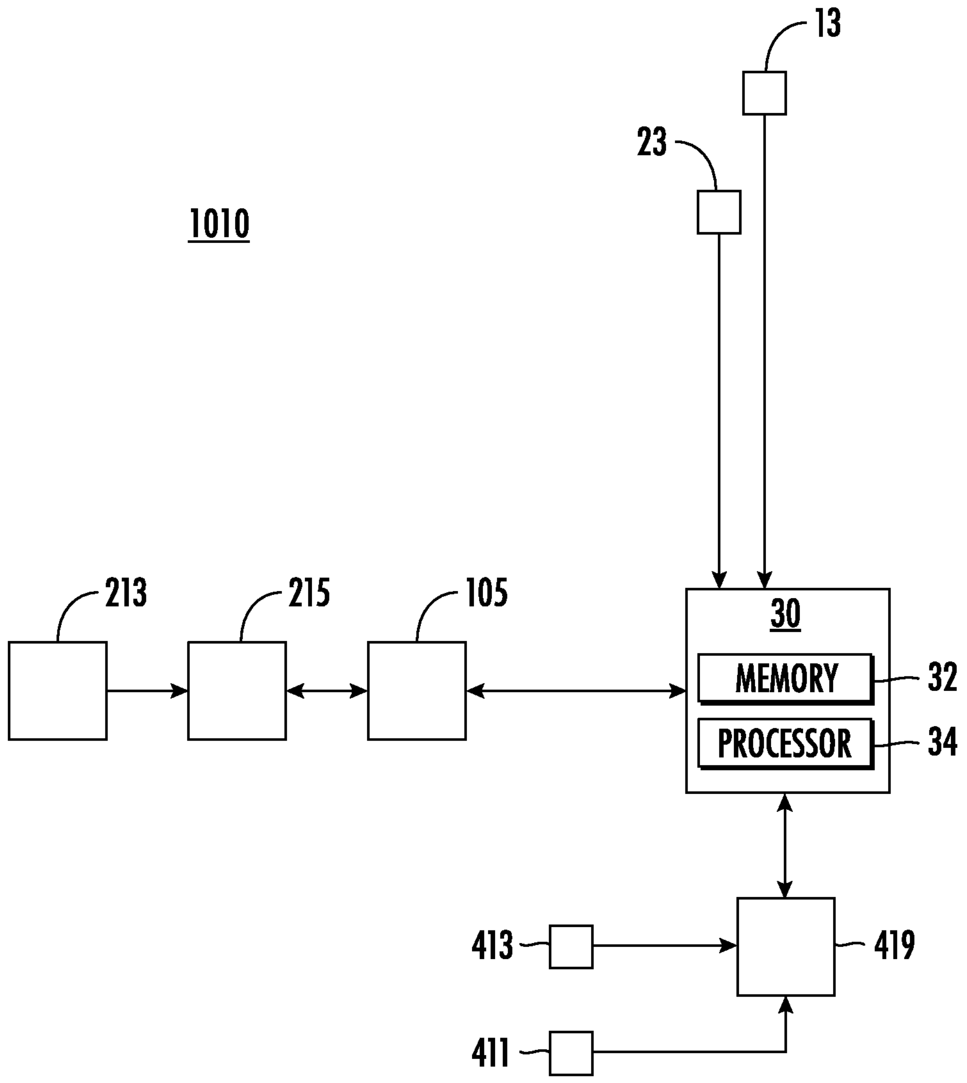
FIG. 2 is a schematic view of a control system of the wellsite hydraulic fracturing pumper system of FIG. 1.

FIG. 2 illustrates a schematic of a control system for the wellsite hydraulic fracturing pumper system 1000 referred to generally as a control system 1010. The control system 1010 includes the controller 30 that is in signal communication with the wellhead pressure transducer 13, a manifold pressure transducer 23, and a pump output transducer 213. The controller 30 includes memory 32 and a processor 34. The memory 32 may be loaded or preloaded with programs, e.g., detection and mitigation protocol programs as detailed below, that are executed on the processor 34. The pump output transducer 213 may be in direct signal or electrical communication with a pump controller 215 which may be in direct signal or electrical communication with a mobile power unit controller 105 with the mobile power unit controller 105 in direct signal or electrical communication with the controller 30 such that the pump output transducer 213 is in signal communication with the controller 30. In some embodiments, the pump output transducer is in direct signal communication with the controller 30. The pump controller 215 is configured to control the fracturing pump 200 in response to commands signals provided by the controller 30 or the mobile power unit controller 30. The pump controller 215 may include a pump profiler that records events experienced by the fracturing pump 200. The recorded events may be used to schedule maintenance of the fracturing pump 200.

The control system 1010 may include a blender controller 419, a blender flow meter 413, and a blender screw encoder/pickup 411. The blender flow meter 413 and the blender screw encoder/pickup 411 may be in direct signal or electrical communication with the blender controller 419 which may be in direct signal or electrical communication with the controller 30 such that the blender flow meter 413 and the blender screw encoder/pickup 411 are in signal communication with the controller 30.

Figure 3:
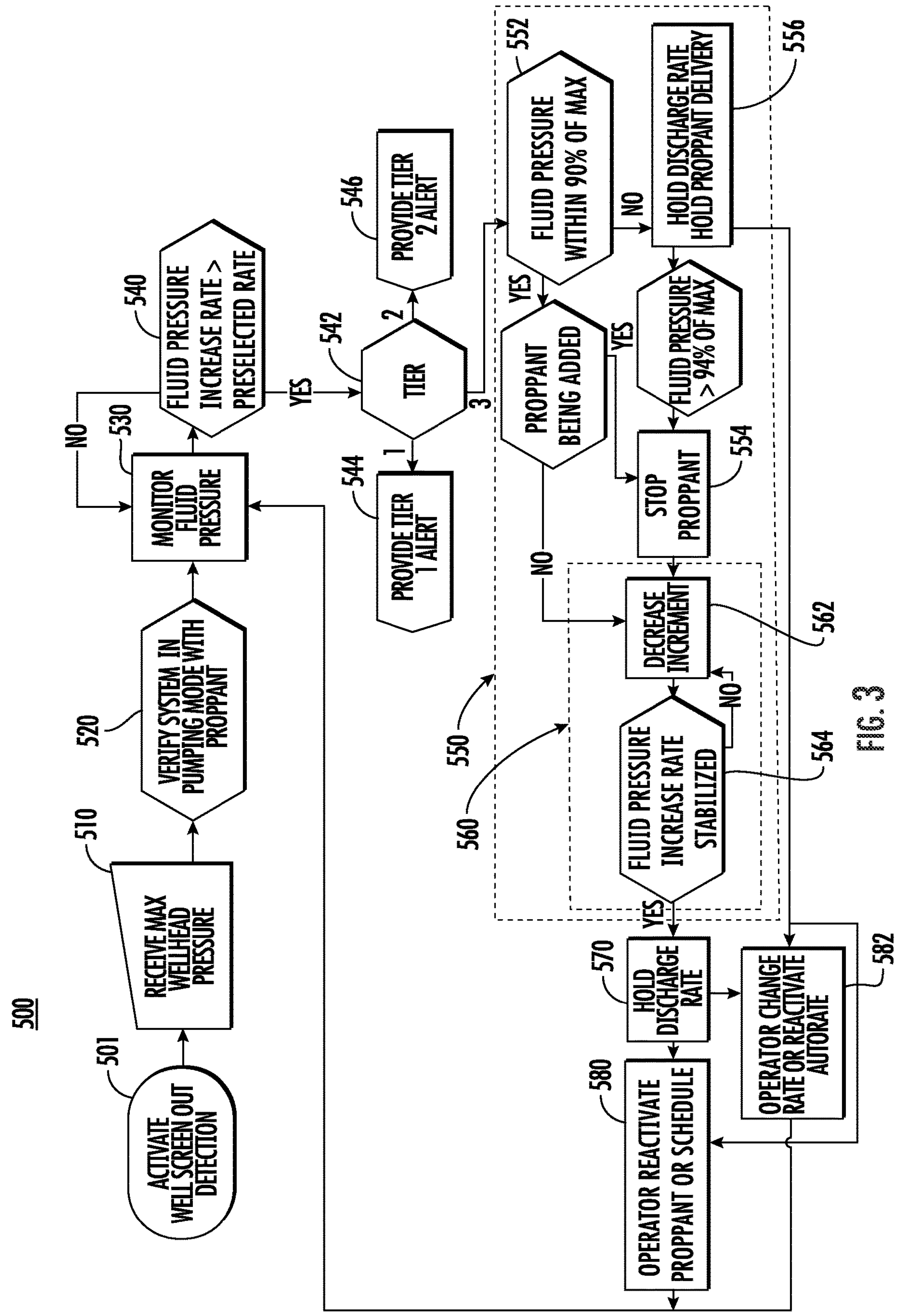
FIG. 3 is a flowchart of a method of detecting and mitigating a well screen out of a well according to an embodiment of the present disclosure.

FIG. 3 illustrates a method of detecting and mitigating well screen out for a hydraulic fracturing operation is described in accordance with embodiments of the present disclosure and is referred to generally as method 500. The method 500 is detailed with reference to the wellsite hydraulic fracturing pumper system 1000 and the control system 1010 of FIGS. 1 and 2. Unless otherwise specified, the actions of the method 500 may be completed within the controller 30. Specifically, the method 500 may be included in one or more programs or protocols loaded into the memory 32 of the controller 30 and executed on the processor 34. The well screen out protocol is activated (Step 501) either automatically when the controller 30 is started or may be manually activated by an operator. When well screen out protocol is activated, a maximum wellhead pressure is provided to the controller 30 (Step 510). The maximum wellhead pressure may be input by an operator into a human interface of the controller 30 or may be a preselected pressure programmed into the controller 30. When the maximum wellhead pressure is provided by an operator, the controller may verify that the inputted maximum wellhead pressure is within a preselected range. If the inputted maximum wellhead pressure is outside of the preselected range, the controller 30 may display an alarm or reject the inputted maximum wellhead pressure and request another value be inputted by the operator and verify the new inputted maximum wellhead pressure until the inputted maximum wellhead pressure is within the preselected range. The preselected range may be in a range of up to 15,000 per square inch (psi), for example, as will be understood by those skilled in the art.

With the maximum wellhead pressure, the controller 30 verifies that the wellsite hydraulic fracturing pumper system 1000 is in a pumping mode in which at least one of the fracturing pumps 200 is active and that the blender unit 410 is adding proppant to the fluid provided to the fracturing pumps 200 (Step 520). The controller 30 may verify the blender unit 410 is adding proppant from verifying that one or more of the screw conveyors 412 is rotating via the blender screw encoder/pickups 411. If either the wellsite hydraulic fracturing pumper system 1000 is not in a pumping mode or that the blender unit 410 is not adding proppant to the fluid being supplied to the fracturing pumps 200 the method 500 is terminated or deactivated. The method 500 may be reactivated manually or when the fracturing pumps 200 and the blender unit 410 are activated to provide fluid including proppant to the wellhead 10.

Continuing to refer to FIG. 3, when the fracturing pumps 200 and the blender unit 410 are activated to provide fluid including proppant to the wellhead 10, the controller 30 monitors a fluid pressure of fluid being provided to the wellhead 10 to detect a potential screen out within the well (Step 530). The fluid pressure of the fluid provided to the wellhead 10 may be monitored from the wellhead pressure transducer 13, the manifold pressure transducer 23, the pump output pressure transducers 213, or combinations thereof. To detect for a potential screen out within the well, the controller 30 monitors a rate of increase of the fluid pressure of fluid being provided to the wellhead 10 which is referred to as fluid pressure increase rate. The fluid pressure increase rate may be calculated by comparing the fluid pressure at a first time $P(t_1)$ and fluid pressure at a second time $P(t_2)$ such that the fluid pressure increase rate is calculated as:

$$\text{Fluid Pressure Increase Rate} = \frac{\Delta P}{\Delta t} = \frac{P(t_2) - P(t_1)}{t_2 - t_1}.$$

The fluid pressure may be sampled at a rate in a range of 1 Hertz (Hz) to 300 Hz and the fluid pressure increase rate may be smoothed by taking an average of 2 samples to 100 samples to prevent a single spike of a sample or an erroneous sample from triggering the detection of a potential screen out.

The calculated fluid pressure increase rate is compared to a preselected increase rate to determine if there is a potential for screen out within the well (Step 540). The preselected increase rate may be an increase rate that is entered by an operator or may be preprogrammed into the controller 30. The preselected increase rate may be based on historical data of well screen out from other wells, for example, or specific to the well being monitored, as will be understood by those skilled in the art. When the fluid pressure increase rate is below the preselected increase rate, the controller 30 continues to monitor the fluid pressure increase rate while proppant is being added to the fluid provided to the fracturing pumps 200.

When the fluid pressure increase rate meets or exceeds the preselected increase rate, a tier of the fluid pressure increase rate may be determined (Step 542). For example, when the fluid pressure increase rate is in a first range of 600 psi/s to 800 psi/s such that the fluid pressure increase rate is a Tier 1 Potential Screen Out and the potential for screen out may be minor. When the fluid pressure increase rate is a Tier 1 Potential Screen Out, the controller 30 provides an alert or message to an operator that the fluid pressure increase rate is high or there is a potential for screen out (Step 544). The message or alert may be a warning light, a message on a screen, an audible alert, or combinations thereof. In response to the alert or message, an operator may take no action, reduce or stop the addition of proppant to the fluid provided to the fracturing pumps 200, or reduce a discharge rate of the fracturing pumps 200.

Continuing with the example, when the fluid pressure increase rate is in a second range of 800 psi/s to 1200 psi/s such that the fluid pressure increase rate is a Tier 2 Potential Screen Out and the potential for screen out is high. When the fluid pressure increase rate is a Tier 2 Potential Screen Out, the controller 30 provides an alarm or message to an operator that the fluid pressure increase rate is high or potential screen out is high (Step 546). The message or alarm may be a warning light, a message on a screen, an audible alert, or combinations thereof and is escalated from the message or alert provided for a Tier 1 Potential Screen Out. In response to the alarm or message, an operator may take no action, reduce or stop the addition of proppant to the fluid provided to the fracturing pumps 200, or reduce a discharge rate of the fracturing pumps 200.

When the fluid pressure increase rate is above the second range, e.g., 1200 psi/s, the potential for screen out is extremely high such that the fluid pressure increase rate is a Tier 3 Potential Screen Out and a screen out is likely. When the fluid pressure increase rate is a Tier 3 Potential Screen Out, a screen out is likely and the controller 30 enters an intervention or mitigation mode to prevent screen out and prevent or reduce damage to the well and the wellsite hydraulic fracturing pumper system 1000 by the mitigation process 550. When the controller 30 begins the mitigation process 550, the controller 30 provides an alert or message to an operator that the mitigation process 550 is running. The message or alert may be a warning light, a message on a screen, an audible alert, or combinations thereof and is escalated from the message or alert provided for a Tier 2 Potential Screen Out.

In the mitigation mode, the controller 30 compares the fluid pressure to the maximum wellhead pressure (Step 552). When the fluid pressure is greater than a first preselected percentage of the maximum wellhead pressure, e.g., 90%, the controller 30 verifies that the blender screw conveyors 412 are not providing proppant to the blender unit 410, e.g., that the blender screw conveyors 412 are not rotating. If the blender screw conveyors 412 are providing proppant to the blender unit 410, the controller 30 stops the blender screw conveyors 412 to stop delivery of proppant (Step 554). When the delivery of proppant is stopped or verified to be stopped, the controller 30 begins to incrementally decrease a discharge rate of the fracturing pumps 200 as defined by process 560.

The process 560 may include multiple iterations of decreases in a discharge rate of the fracturing pumps 200 by a preselected increment (Step 562) and determining the fluid pressure increase rate (Step 564). The process 560 continues to iterate through Steps 562 and 564 until the fluid pressure increase rate is no longer increasing or stabilized, e.g., less than or equal to zero. The preselected increment may be in a range of 0.5 barrels per minute (BPM) to 10 BPM, e.g., 2 BPM. In some embodiments, the preselected increment is less than 5 BPM. The process 560 may include decreasing the discharge rate of the fracturing pumps 200 by the preselected increment (Step 562) and delaying the determining the fluid pressure increase rate (Step 564) for a period of time or a number of cycles of the fracturing pump 200, e.g., 1 second or 25 cycles or revolutions of the fracturing pump 200. The delay in determining the fluid pressure increase rate may allow for the fluid pressure to react to the decreased discharge rate before the fluid pressure increase rate is determined. During each iteration of the process 560, the controller 30 may sequence the flow rate of the blender unit 410 and the discharge rate of the fracturing pump 200. Specifically, the controller 30 may first send a control signal to the fracturing pump 200 to decrease a discharge rate of the fracturing pump 200 by the increment and then send a control signal to the blender unit 410, e.g., the discharge pump 418 of the blender unit 410, to decrease a flow rate of fluid to the fracturing pump 200. By sequencing the blender unit 410 and the fracturing pumps 200 cavitation at the fracturing pumps 200 may be avoided. In addition, by the controller 30 sequencing the blender unit 410 and the fracturing pumps 200, the need for an operator to manually sequence the blender unit 410 and the fracturing pumps 200 to maintain a safe operation state is removed.

When the fluid pressure increase rate is stabilized such that the fluid pressure is not increasing or is decreasing (e.g., equal to or less than zero), the controller 30 terminates the mitigation process 550 and maintains the discharge rate of the fracturing pumps 200 (Step 570). When the mitigation process 550 is completed, an operator may begin providing proppant to in the fluid provided to the fracturing pumps 200 by activating the blender screw conveyors 412 (Step 580) and/or may manually change the discharge rate of the fracturing pumps 200 (Step 582). When the operator takes control at Steps 580, 582, the operator may reactivate an automatic or scheduled program of the operation the controller 30 returns to monitoring the fluid pressure increase rate of Step 530.

Returning back to the entry into the mitigation process 550, when the fluid pressure increase rate is a Tier 3 Potential Screen Out and the fluid pressure is below or less than the first preselected percentage of the maximum fluid pressure, e.g., 90%, the controller 30 maintains the discharge rate of the fracturing pumps 200 and the delivery of the proppant (Step 556). When the discharge rate of the fracturing pumps 200 and the delivery of the proppant is maintained, an operator may provide input to the controller 30 to manually change the discharge rate of the fracturing pumps 200 or reactivate an automatic or scheduled program to the operation of the controller 30 (Step 582). If an operator does not intervene, the controller 30 continues to monitor fluid pressure.

If the operator does not intervene and the fluid pressure reaches a second preselected percentage of the maximum fluid pressure, e.g., 94%, the controller 30 intervenes by preparing for and running the process 560. Specifically, the controller 30 prepares for the process 560 by stopping the blender screw conveyors 412 to stop delivery of proppant (Step 554). When the delivery of proppant is stopped, the controller 30 begins the process 560 to incrementally decrease a discharge rate of the fracturing pumps 200 as detailed above until by cycling through Step 562 and Step 564 until the fluid pressure increase rate is no longer increasing or stabilized, e.g., less than or equal to zero. When the fluid pressure increase rate is stabilized, the discharge rate of the fracturing pumps 200 is maintained (Step 570) such that the mitigation process 550 is complete or terminated. When the mitigation process 550 is completed, an operator may begin providing proppant to in the fluid provided to the fracturing pumps 200 by activating the blender screw conveyors 412 (Step 580) and/or may manually change the discharge rate of the fracturing pumps 200 (Step 582). When the operator takes control at Steps 580, 582, the operator may reactivate an automatic or scheduled program of the operation the controller 30 returns to monitoring the fluid pressure increase rate of Step 530.

The mitigation process 550 enables the controller 30 to automatically stop delivery of proppant to the fluid provided to the fracturing pumps 200 and to decrease the discharge rate of the fracturing pumps 200 until the fluid pressure increase rate is stabilized without input from an operator. During the mitigation process 550, including the process 560, an operator may be prevented or locked out from certain commands of the controller 30. For example, in some embodiments, during the mitigation process 550, an operator may be locked out of all commands to the controller 30 except at step 556 until the mitigation process 550 such that the fluid pressure increase rate has been stabilized. In certain embodiments, an operator may be locked out of increasing the discharge rate of the fracturing pumps 200 or initiating or increasing delivery of proppant during the mitigation process 550.

By reducing well screen out, the need for operations to reopen fractures or a well (e.g., wire line operations) may be reduced or eliminated such that time, and thus costs, to stimulate a well may be reduced. In addition, the method 500 of detecting and mitigating well screen out with a controller 30 may reduce rapid pressure increases associated with well screen outs such that stress on fracturing equipment may be reduced. The fracturing equipment may include, but not be limited to, fracturing pumps, power end assemblies of power units (e.g., gas turbine engines), gearboxes, transmissions, and piping or iron of the well site. Further, by intervening before the fluid supplied to the wellhead reaches the maximum fluid pressure, reliance on pressure relief valves, such as a wellhead pressure relief valve, may be reduced. Reducing reliance on pressure relief valves may conserve energy by not releasing pressure within the system and reduce stress on the fracturing equipment by maintaining a more consistent fluid pressure within the maximum wellhead pressure.

The method 500 being executed by the controller 30 allows for continuous monitoring of the fluid pressure and the fluid pressure increase rate at higher rate (e.g., 1 Hz to 300 Hz) when compared to relying on manual control and monitoring. In addition, by including multiple tiers of warnings (e.g., Tier 1 and Tier 2) the controller 30 alerts an operator to intervene before the fluid pressure approaches the maximum wellhead pressure and may automatically intervene if the fluid pressure increase rate reaches Tier 3 and the fluid pressure approaches the maximum wellhead pressure.

This is a continuation of U.S. Non-Provisional application Ser. No. 17/991,007, filed Nov. 21, 2022, titled "METHODS FOR DETECTION AND MITIGATION OF WELL SCREEN OUT," now U.S. Pat. No. 11,939,854 issued Mar. 26, 2024, which is a continuation of U.S. Non-Provisional application Ser. No. 17/355,920, filed Jun. 23, 2021, titled "METHODS FOR DETECTION AND MITIGATION OF WELL SCREEN OUT," now U.S. Pat. No. 11,566,506 issued Jan. 31, 2023, which is continuation of U.S. Non-Provisional application Ser. No. 17/303,841, filed Jun. 9, 2021, titled "METHODS AND SYSTEMS FOR DETECTION AND MITIGATION OF WELL SCREEN OUT," now U.S. Pat. No. 11,208,881, issued Dec. 28, 2021, which is a continuation of U.S. Non-Provisional application Ser. No. 17/182,408, filed Feb. 23, 2021, titled "METHODS FOR DETECTION AND MITIGATION OF WELL SCREEN OUT," now U.S. Pat. No. 11,066,915, issued Jul. 20, 2021, which claims priority to and the benefit of U.S. Provisional Application No. 62/705,050, filed Jun. 9, 2020, titled "METHODS AND SYSTEMS FOR DETECTION AND MITIGATION OF WELL SCREEN OUT," the disclosures of which are incorporated herein by reference in their entireties.

The foregoing description of the disclosure illustrates and describes various exemplary embodiments. Various additions, modifications, changes, etc., may be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed:

1. A wellsite hydraulic fracturing pumper system, the system comprising:

one or more fracturing pumps configured to pump fluid to a wellhead when positioned at a hydrocarbon well site;

one or more pressure transducers positioned at a location of one or more of: (a) adjacent an output of the one or more fracturing pumps, and (b) at the wellhead, the one or more pressure transducers each configured to measure a fluid pressure of the fluid provided to the wellhead; and a controller to control the one or more fracturing pumps and positioned in signal communication with the one or more pressure transducers such that the controller receives the fluid pressure of the fluid provided to the wellhead, the controller (a) including memory, a processor to process data, and a screen out detection and mitigation protocol program stored in the memory and (b) being responsive to a process in which the protocol of the controller incrementally decreases a discharge rate of the one or more fracturing pumps, in response to: (i) a fluid pressure increase rate of the fluid supplied to the wellhead being greater than a preselected increase rate, and (ii) the fluid pressure of the fluid provided to the wellhead being greater than a preselected percentage of a maximum wellhead pressure, until the fluid pressure is stabilized.

2. The wellsite hydraulic fracturing pumper system according to claim 1, wherein the screen out detection and mitigation protocol includes an alarm to provide an alert indicative of when the fluid pressure increase rate is greater than the preselected increase rate before the pressure of the fluid provided to the wellhead is within the preselected percentage of the maximum wellhead pressure.

3. The wellsite hydraulic fracturing pumper system according to claim 2, wherein the one or more pressure transducers also are positioned at a location adjacent the output of the one or more fracturing pumps.

4. The wellsite hydraulic fracturing pumper system according to claim 3, further comprising one or more blenders configured to provide fluid and proppant to the one or more fracturing pumps, wherein each of the one or more blenders includes a blender conveyor configured to rotate such that proppant is provided to the one or more fracturing pumps in response to rotation of the blender conveyor.

5. The wellsite hydraulic fracturing pumper system according to claim 4, the controller further being responsive to a process in which the protocol of the controller incrementally decreases a flow rate of the one or more blenders, wherein incrementally decreasing the discharge rate of the one or more fracturing pumps and the flow rate of the one or more blenders by the controller includes stopping delivery of proppant at the one or more blenders prior to decreasing the discharge rate of the fracturing pump when the one or more blenders are delivering proppant.

6. The wellsite hydraulic fracturing pumper system according to claim 5, wherein incrementally decreasing the discharge rate of the one or more fracturing pumps and the flow rate of the one or more blenders by the controller includes decreasing the discharge rate of the one or more fracturing pumps prior to decreasing the flow rate of the one or more blenders.

7. A wellsite hydraulic fracturing pumper system, the system comprising:

one or more fracturing pumps configured to pump fluid to a wellhead when positioned at a hydrocarbon well site;

one or more pressure transducers positioned at a location of one or more of: (a) adjacent an output of the one or more fracturing pumps, (b) at the wellhead, the one or more pressure transducers each configured to measure a fluid pressure of the fluid provided to the wellhead, and (c) adjacent the output of the one or more fracturing pumps; and a controller to control the one or more fracturing pumps and positioned in signal communication with the one or more pressure transducers such that the controller receives the fluid pressure of the fluid provided to the wellhead, the controller configured to incrementally decrease a discharge rate of the one or more fracturing pumps in response to: (i) a fluid pressure increase rate of the fluid supplied to the wellhead being greater than a preselected increase rate, and (ii) the fluid pressure of the fluid provided to the wellhead being greater than a preselected percentage of a maximum wellhead pressure, until the fluid pressure is stabilized.

8. The wellsite hydraulic fracturing pumper system according to claim 7, wherein the one or more pressure transducers also are positioned at a location adjacent the output of the one or more fracturing pumps.

9. The wellsite hydraulic fracturing pumper system according to claim 7, further comprising one or more blenders configured to provide fluid and proppant to the one or more fracturing pumps.

10. The wellsite hydraulic fracturing pumper system according to claim 9, the controller further being responsive to a process in which the protocol of the controller incrementally decreases a flow rate of the one or more blenders, wherein incrementally decreasing the discharge rate of the one or more fracturing pumps and the flow rate of the one or more blenders by the controller includes stopping delivery of proppant at the one or more blenders prior to decreasing the discharge rate of the fracturing pump when the one or more blenders are delivering proppant.

11. The wellsite hydraulic fracturing pumper system according to claim 10, wherein incrementally decreasing the discharge rate of the one or more fracturing pumps and the flow rate of the one or more blenders by the controller includes decreasing the discharge rate of the one or more fracturing pumps prior to decreasing the flow rate of the one or more blenders.

12. The wellsite hydraulic fracturing pumper system according to claim 7, wherein the controller is configured to incrementally decrease the discharge rate of the one or more fracturing pumps by one or more increments, each increment in the range of 0.5 barrels per minute to 10 barrels per minute.

13. A wellsite hydraulic fracturing pumper system, the system comprising:

one or more mobile fracturing pump units to pump fluid to a wellhead when positioned at a hydrocarbon well site, each of the fracturing pump units comprising a gas turbine engine configured to drive a fracturing pump;

one or more pressure transducers configured to be positioned at a location of one or more of: (a) adjacent an output of the one or more fracturing pumps, or (b) at the wellhead, and to measure a fluid pressure of the fluid when provided to the wellhead; and a controller to control the one or more fracturing pumps and configured to be positioned in signal communication with the one or more pressure transducers such that the controller receives measurement of the fluid pressure of the fluid when provided to the wellhead and controllingly stabilizes the fluid pressure when the fluid pressure supplied to the wellhead increases greater than a preselected increase rate and being greater than a preselected percentage of a maximum wellhead pressure, the controller configured to incrementally decrease a discharge rate of the one or more fracturing pumps, in response to a fluid pressure measurement obtained by the one or more pressure transducers.

14. The wellsite hydraulic fracturing pumper system according to claim 13, wherein the controller comprises a memory, a processor to process data, and a screen out detection and mitigation protocol program stored in the memory, the controller being responsive to a process in which the protocol of the controller incrementally decreases a discharge rate of the one or more fracturing pumps, in response to: (i) a fluid pressure increase rate of the fluid supplied to the wellhead being greater than a preselected increase rate, and (ii) the fluid pressure of the fluid provided to the wellhead being greater than a preselected percentage of a maximum wellhead pressure.

15. The wellsite hydraulic fracturing pumper system according to claim 14, wherein the screen out detection and mitigation protocol includes an alarm to provide an alert indicative of when the fluid pressure increase rate is greater than the preselected increase rate before the pressure of the fluid provided to the wellhead is within the preselected percentage of the maximum wellhead pressure.

16. The wellsite hydraulic fracturing pumper system according to claim 15, wherein the controller is configured to incrementally decrease the discharge rate of the one or more fracturing pumps by one or more increments, each increment in the range of 0.5 barrels per minute to 10 barrels per minute.

17. The wellsite hydraulic fracturing pumper system according to claim 16, wherein the controller is configured to delay determination of a fluid pressure increase rate after incrementally decreasing the discharge rate of the one or more fracturing pumps by the one or more increments.

18. The wellsite hydraulic fracturing pumper system according to claim 13, wherein the one or more pressure transducers also are positioned at a location adjacent the output of the one or more fracturing pumps.

19. The wellsite hydraulic fracturing pumper system according to claim 13, wherein the controller is configured to incrementally decrease the discharge rate of the one or more fracturing pumps by one or more increments, each increment in the range of 0.5 barrels per minute to 10 barrels per minute.

* * * * *